United States Patent
Sasaki et al.

(10) Patent No.: US 12,516,391 B2
(45) Date of Patent: Jan. 6, 2026

(54) STAINLESS STEEL SEAMLESS PIPE AND METHOD FOR MANUFACTURING SAME

(71) Applicant: JFE Steel Corporation, Tokyo (JP)

(72) Inventors: Shunsuke Sasaki, Tokyo (JP); Masao Yuga, Tokyo (JP); Tatsuro Katsumura, Tokyo (JP); Hideo Kijima, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 638 days.

(21) Appl. No.: 17/795,031

(22) PCT Filed: Dec. 25, 2020

(86) PCT No.: PCT/JP2020/048674
§ 371 (c)(1),
(2) Date: Jul. 25, 2022

(87) PCT Pub. No.: WO2021/157251
PCT Pub. Date: Aug. 12, 2021

(65) Prior Publication Data
US 2023/0090789 A1    Mar. 23, 2023

(30) Foreign Application Priority Data
Feb. 5, 2020 (JP) .................................. 2020-017752

(51) Int. Cl.
| | |
|---|---|
| *C21D 9/08* | (2006.01) |
| *C21D 1/26* | (2006.01) |
| *C21D 6/00* | (2006.01) |
| *C21D 7/10* | (2006.01) |
| *C21D 8/10* | (2006.01) |
| *C22C 38/00* | (2006.01) |
| *C22C 38/02* | (2006.01) |
| *C22C 38/50* | (2006.01) |
| *C22C 38/60* | (2006.01) |
| C22C 38/04 | (2006.01) |
| C22C 38/44 | (2006.01) |
| C22C 38/46 | (2006.01) |
| C22C 38/48 | (2006.01) |

(52) U.S. Cl.
CPC .............. *C21D 6/004* (2013.01); *C21D 1/26* (2013.01); *C21D 7/10* (2013.01); *C21D 8/10* (2013.01); *C21D 8/105* (2013.01); *C21D 9/08* (2013.01); *C22C 38/001* (2013.01); *C22C 38/02* (2013.01); *C22C 38/50* (2013.01); *C22C 38/60* (2013.01); *C21D 2211/001* (2013.01); *C21D 2211/005* (2013.01); C22C 38/00 (2013.01); C22C 38/04 (2013.01); C22C 38/44 (2013.01); C22C 38/46 (2013.01); C22C 38/48 (2013.01); Y02E 10/10 (2013.01)

(58) Field of Classification Search
CPC .................................................... C21D 9/08
See application file for complete search history.

(56) References Cited

U.S. PATENT DOCUMENTS

| | | |
|---|---|---|
| 11,306,369 B2 | 4/2022 | Kamo et al. |
| 2015/0107724 A1 | 4/2015 | Sawawatari et al. |
| 2015/0152531 A1 | 6/2015 | Eguchi et al. |
| 2015/0315684 A1 | 11/2015 | Eguchi et al. |
| 2019/0211416 A1 | 7/2019 | Yoshimura et al. |
| 2022/0018007 A1 | 1/2022 | Sasaki et al. |
| 2022/0364211 A1 | 11/2022 | Kamo et al. |
| 2023/0048685 A1 | 2/2023 | Kamo et al. |
| 2023/0090789 A1 | 3/2023 | Sasaki et al. |
| 2023/0128437 A1 | 4/2023 | Eguchi et al. |
| 2023/0137295 A1 | 5/2023 | Kamo et al. |

FOREIGN PATENT DOCUMENTS

| | | |
|---|---|---|
| CN | 109563581 A | 4/2019 |
| EP | 2116316 A1 | 11/2009 |
| EP | 3456852 A1 | 3/2019 |
| JP | 2001220652 A | 8/2001 |
| JP | 2002069587 A | 3/2002 |
| JP | 5500324 B1 | 5/2014 |
| JP | 2018003139 A | 1/2018 |
| WO | 2014034522 A1 | 3/2014 |
| WO | 2018043214 A1 | 3/2018 |
| WO | 2020044988 A1 | 3/2020 |
| WO | 2020110597 A1 | 6/2020 |

OTHER PUBLICATIONS

International Search Report and Written Opinion for International Application No. PCT/JP2020/048674, dated Feb. 9, 2021, 6 pages.
Extended European Search Report for European Application No. 20918063.7, dated Nov. 9, 2022, 14 pages.
Chinese Office Action with Search Report for Chinese Application No. 202080095422.5, dated Apr. 19, 2023, 9 pages.
"Oil Country Tubular Goods", Jan. 1, 2018, 39 pages, XP055975573, Retrieved from the Internet: https://www.jfe-steel.co.jp/en/products/pipes/catalog/ele-012.pdf [retrieved on Oct. 27, 2022].
Non Final Office Action for U.S. Appl. No. 17/599,219 mailed Mar. 12, 2024. (10 pages).

*Primary Examiner* — Jophy S. Koshy
(74) *Attorney, Agent, or Firm* — Buchanan Ingersoll & Rooney PC

(57) ABSTRACT

A stainless steel seamless pipe is provided that is a stainless steel comprising, in mass %, Cr: 11.5 to 35.0%, and Mo: 0.5 to 6.0%, and including ferrite and austenite, the stainless steel seamless pipe having a ferrite grain boundary and/or a ferrite-austenite grain boundary with a Mo concentration (mass %) that is at most 4.0 times the intragranular Mo concentration (mass %) of ferrite, or an austenite grain boundary with a Mo concentration (mass %) that is at most 4.0 times the intragranular Mo concentration (mass %) of austenite, the stainless steel seamless pipe having an axial tensile yield strength of 689 MPa or more, and an axial compressive yield strength/axial tensile yield strength ratio of 0.85 to 1.15.

22 Claims, 5 Drawing Sheets

[FIG. 1]
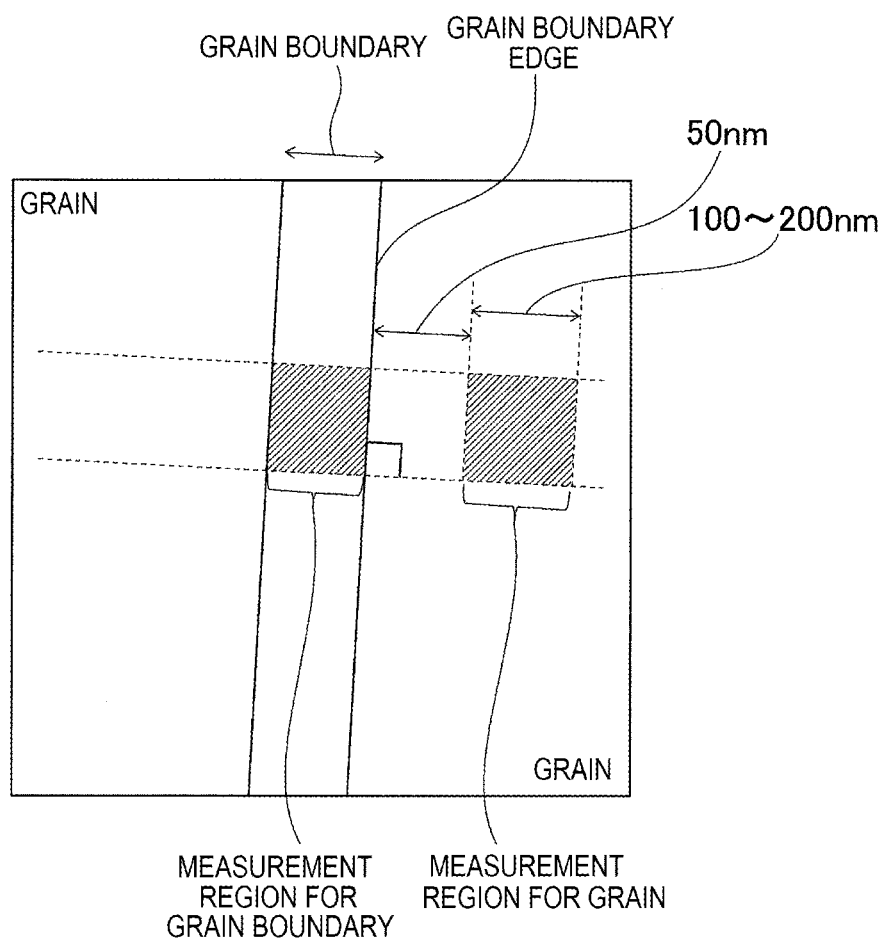

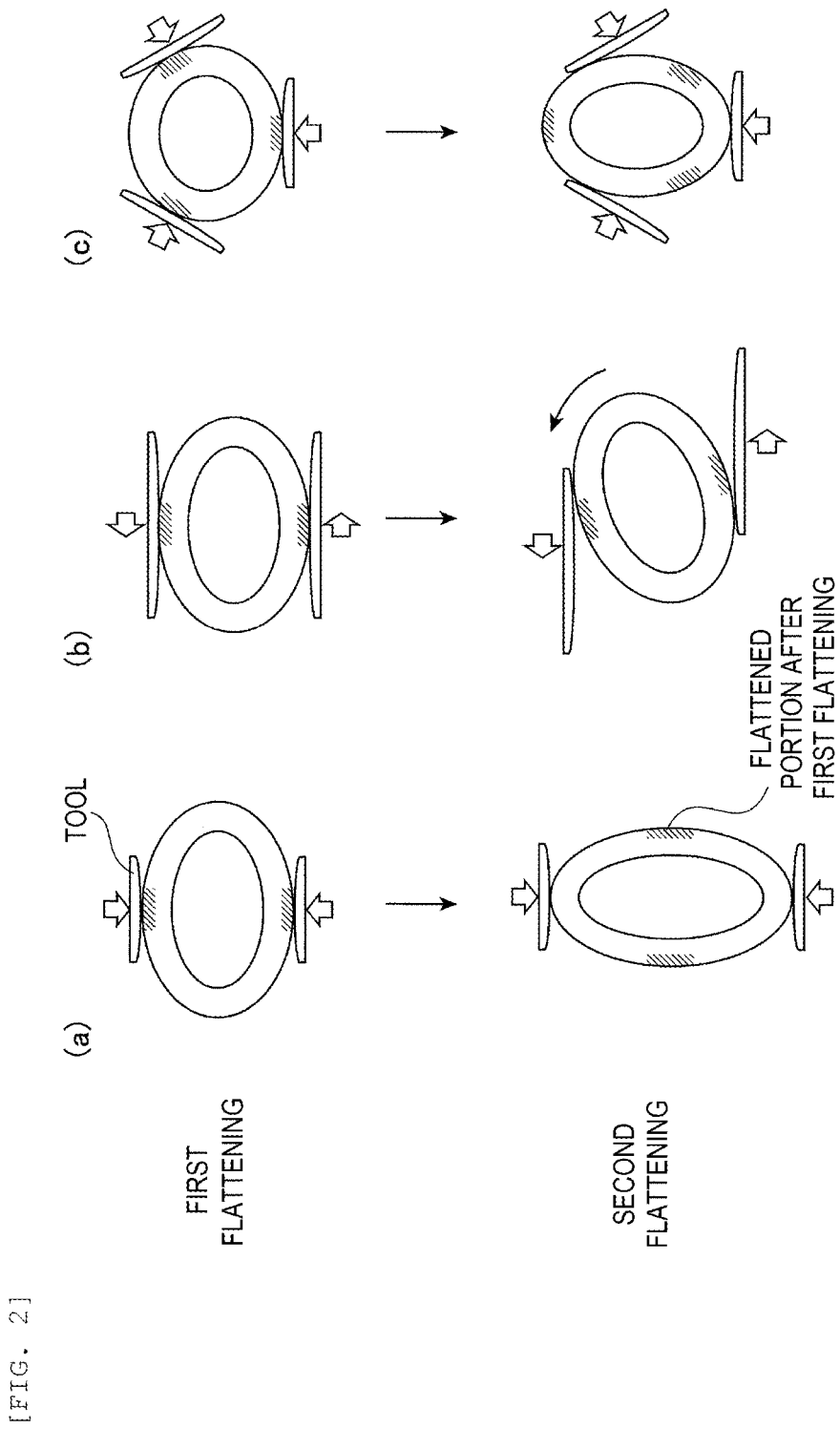

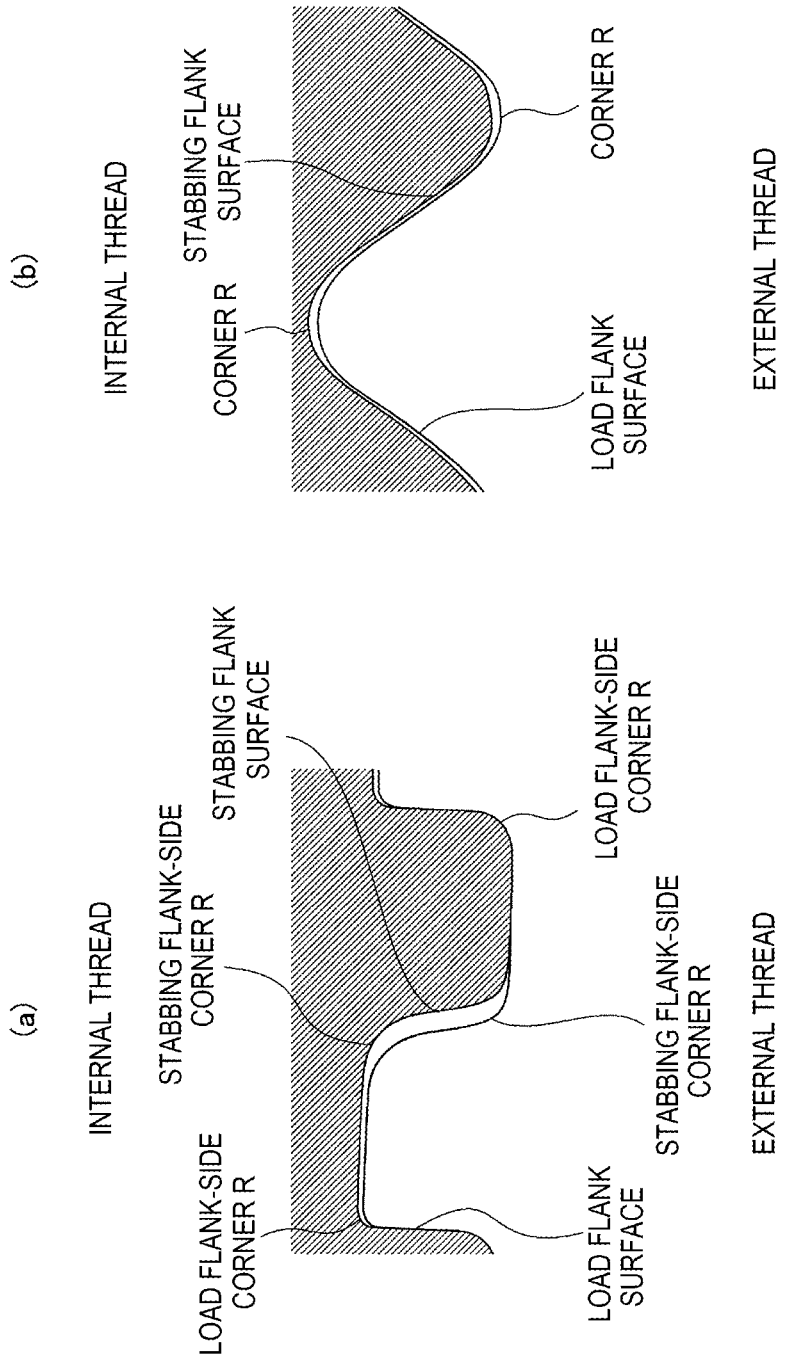

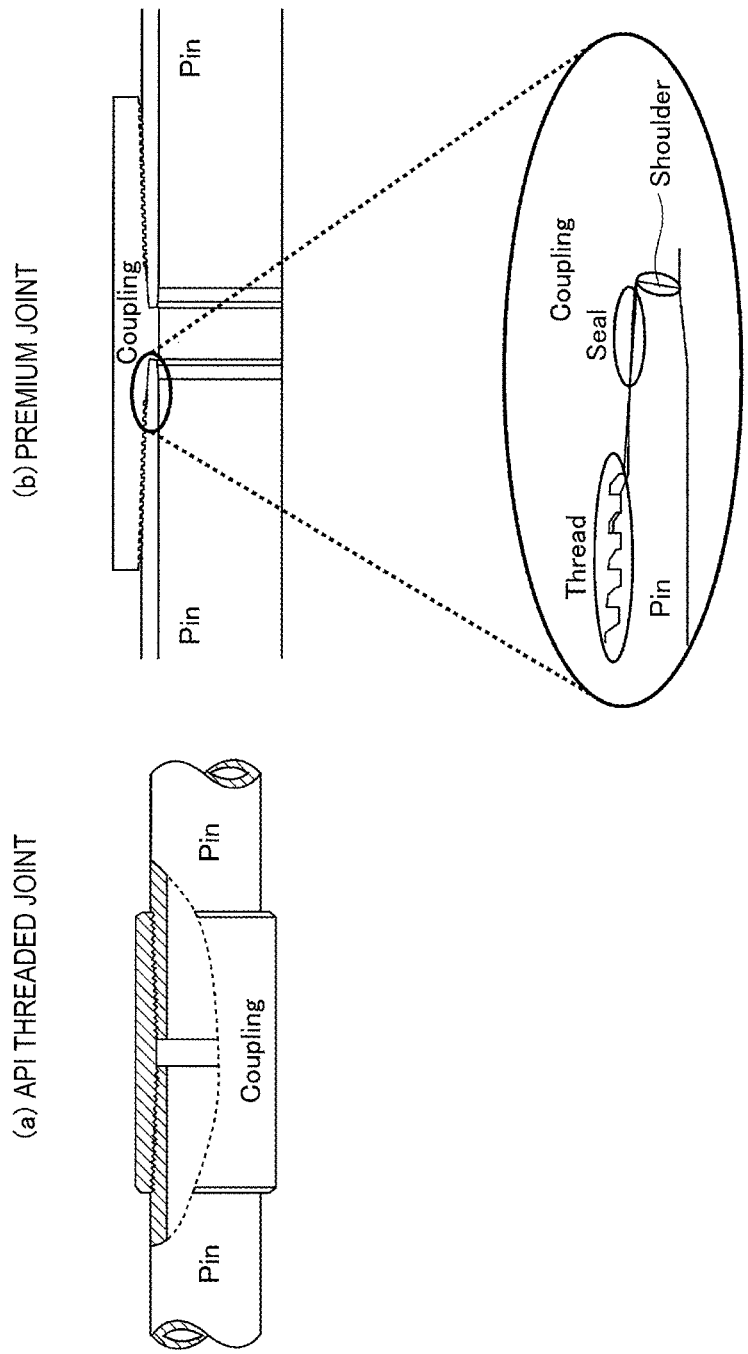
[FIG. 4]

[FIG. 5]
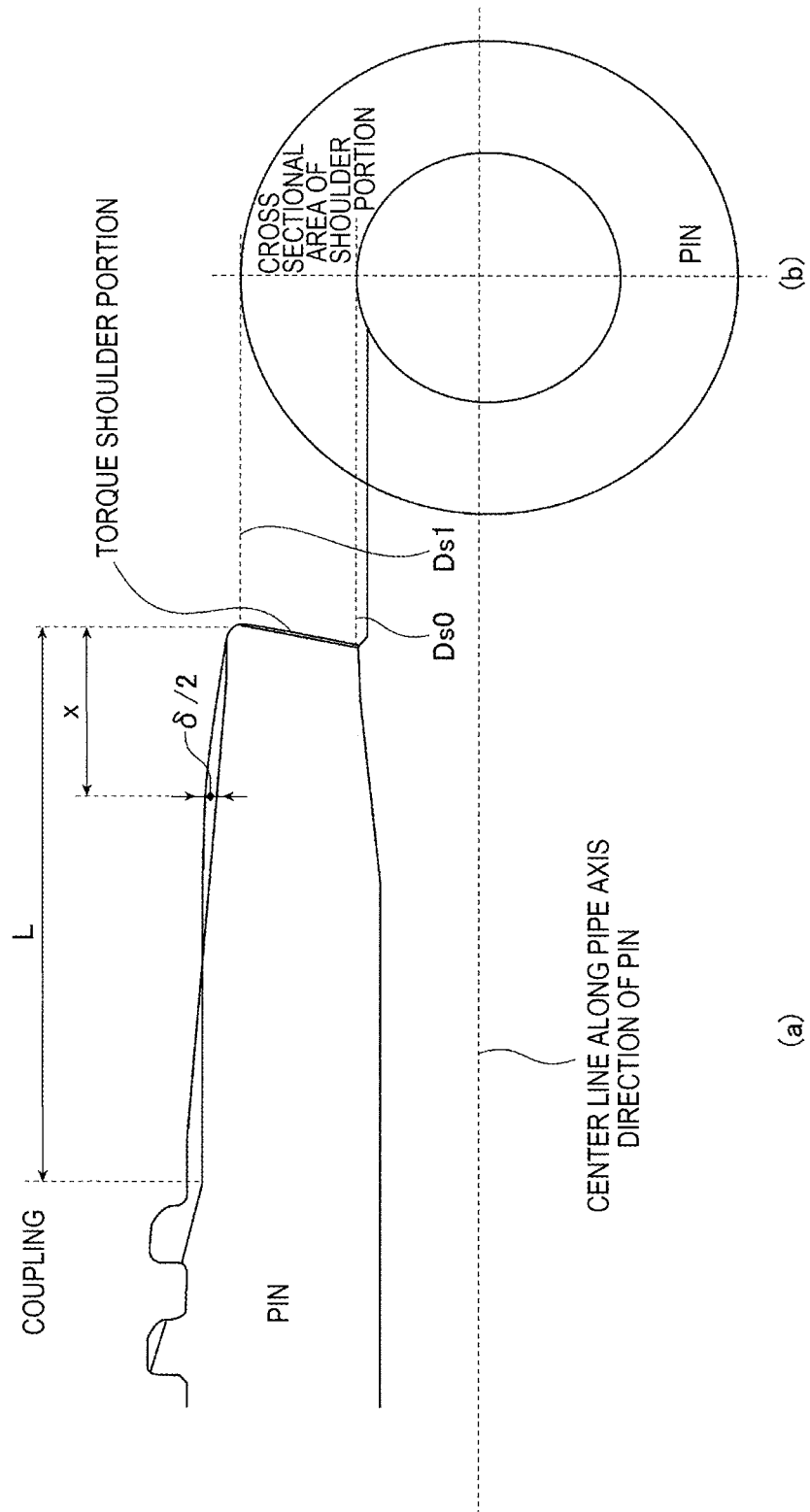

STAINLESS STEEL SEAMLESS PIPE AND METHOD FOR MANUFACTURING SAME

CROSS REFERENCE TO RELATED APPLICATIONS

This is the U.S. National Phase application of PCT/JP2020/048674, filed Dec. 25, 2020, which claims priority to Japanese Patent Application No. 2020-017752, filed Feb. 5, 2020, the disclosures of these applications being incorporated herein by reference in their entireties for all purposes.

FIELD OF THE INVENTION

The present invention relates to a stainless steel seamless pipe having excellent axial tensile yield strength and excellent corrosion resistance and having a small difference between its axial tensile yield strength and axial compressive yield strength. The invention also relates to a method for manufacturing such a stainless steel seamless pipe. Here, axial tensile yield strength and axial compressive yield strength having a small difference means that the ratio of axial compressive yield strength to axial tensile yield strength falls within a range of 0.85 to 1.15.

BACKGROUND OF THE INVENTION

Important considerations for seamless steel pipes used for mining of oil wells and gas wells or for geothermal well applications include corrosion resistance that can withstand a highly corrosive environment under high temperature and high pressure, and high strength characteristics that can withstand the tensile stress due to the deadweight of pipe, and the high-temperature thermal stress and the high pressure when pipes are joined and used deep underground. Of importance for corrosion resistance is the amounts by which corrosion resistance improving elements such as Cr, Mo, W, and N are added to steel. In this connection, various dual phase stainless steels are available, including, for example, SUS329J3L containing 22% Cr, SUS329J4L containing 25% Cr, and ISO 532750 and 532760 containing increased amounts of Mo.

The most important strength characteristic is the axial tensile yield strength, and a value of axial tensile yield strength represents the specified strength of the product. This is most important because the pipe needs to withstand the tensile stress due to its own weight when joined and used deep underground. With a sufficiently high axial tensile yield strength against the tensile stress due to its weight, the pipe undergoes less plastic deformation, and this prevents damage to the passive film that is important for maintaining the corrosion resistance of pipe surface.

While the axial tensile yield strength is most important with regard to the specified strength of the product, the axial compressive yield strength is important for the pipe joint. From the standpoint of preventing fire or allowing for repeated insertion and removal, pipes used for oil well and gas wells or for geothermal well applications cannot be joined by welding, and threads are used to make a joint.

A dual phase stainless steel has two phases in its microstructure: the ferrite phase, and the austenite phase which, crystallographically, has low yield strength. Because of this, a dual phase stainless steel, in an as-processed form after hot forming or heat treatment, cannot provide the tensile strength needed for use as oil country tubular goods or in geothermal well applications. For this reason, pipes to be used as oil country tubular goods or in geothermal well applications are processed to improve axial tensile yield strength by dislocation strengthening using various cold rolling techniques. The cold rolling techniques intended for pipes to be used as oil country tubular goods or in geothermal well applications are limited to cold drawing and cold pilgering. In fact, NACE (The National Association of Corrosion Engineers), which provides international standards for use of oil country tubular goods, lists cold drawing and cold pilgering as the only definitions of cold rolling. These cold rolling techniques both represent a longitudinal cold rolling process that reduces the wall thickness and the diameter of a pipe, and dislocation strengthening, induced by strain, acts most effectively for improvement of tensile yield strength along the longitudinal axis of a pipe. In the foregoing cold rolling techniques that longitudinally apply strain along the pipe axis, a strong Bauschinger effect occurs along a pipe axis direction, and the compressive yield strength along the axial direction of pipe is known to show an about 20% decrease. For this reason, it is common practice in strength design to take the Bauschinger effect into account, and reduce the compressive yield strength at the thread make-up portion or torque shoulder portion where axial compressive yield strength characteristics are needed. Indeed, the strength design of thread make-up portion influences the overall product specifications.

PTL 1 addresses this issue by proposing a dual phase stainless steel pipe that contains, in mass %, C: 0.008 to 0.03%, Si: 0 to 1%, Mn: 0.1 to 2%, Cr: 20 to 35%, Ni: 3 to 10%, Mo: 0 to 4%, W: 0 to 6%, Cu: 0 to 3%, N: 0.15 to 0.35%, and the balance being iron and impurities, and has a tensile yield strength $YS_{LT}$ of 689.1 to 1000.5 MPa along an axial direction of the dual phase stainless steel pipe, and in which the tensile yield strength, $YS_{LT}$, a compressive yield strength, $YS_{LC}$, along the axial direction of the pipe, a tensile yield strength, $YS_{CT}$, along a circumferential direction of the dual phase stainless steel pipe, and a compressive yield strength, $YS_{CC}$, along the circumferential direction of the pipe satisfy predetermined formulae.

PATENT LITERATURE

PTL 1: Japanese Patent No. 5500324

SUMMARY OF THE INVENTION

However, PTL 1 does not give consideration to corrosion resistance.

The present invention has been made under these circumstances, and it is an object according to aspects of the present invention to provide a stainless steel seamless pipe having excellent corrosion resistance and high axial tensile yield strength and having a small difference between its axial tensile yield strength and axial compressive yield strength. Aspects of the invention are also intended to provide a method for manufacturing such a stainless steel seamless pipe.

In order to improve the corrosion resistance performance of a dual phase stainless steel, it is highly important to increase the solid-solution amounts of corrosion resistant elements Cr and Mo in steel. In this way, the steel is able to exhibit high corrosion resistance performance by forming a stronger corrosion resistant coating and inhibiting generation of a corrosion initiation point. In order to protect the material from various forms of corrosion, it is also of importance to bring the fractions of ferrite phase and austenite phase to an appropriate dual phase state in the microstructure.

Cr is an essential element that defines a stainless steel. Cr prevents dissolution of iron by strengthening the passive film, and inhibits reduction of material weight and reduction of wall thickness. Mo is an important element for inhibiting pitting corrosion, which becomes most problematic when stress is applied in a corrosive environment. In a seamless steel pipe of dual phase stainless steel, it is important that these two elements exist in the form of a solid solution, and be evenly distributed in the steel so that the material surface does not have areas of low Cr and Mo concentrations, that is, areas of weak corrosion resistance performance.

In a dual phase stainless steel seamless pipe, the steel generates intermetallic compounds and various carbides and nitrides in hot rolling and in subsequent cooling processes during manufacture. These compounds all contain corrosion resistant elements. In the form of intermetallic compounds and various carbides and nitrides, the corrosion resistant elements do not contribute to corrosion resistance performance, and become a cause of a corrosion resistance performance drop. This is prevented by a solid-solution heat treatment performed at a high temperature of at least 1,000° C. following hot forming, in order to form a solid solution of corrosion resistant elements in steel, and to bring the phase fractions to an appropriate dual phase state. This is followed by dislocation strengthening by cold rolling, should strengthening be needed. The product, in an as-processed form after the solid-solution heat treatment or cold rolling, shows high corrosion resistance performance with most of the effective elements against corrosion existing as a solid solution. That is, in order to provide desirable corrosion resistance performance, it is very important that the product obtained after the solid solution heat treatment maintain a solid-solution state of corrosion resistant elements in steel.

As discussed above, in order for a seamless steel pipe having high corrosion resistance performance to be used for oil wells or gas wells or for geothermal well applications, improvement of axial tensile yield strength of a steel pipe is very important, in addition to the strength characteristics of the threaded portion used for make-up. In a premium joint, the strength characteristics of torque shoulder portions are also of great importance. The microstructure of high-corrosion-resistance material such as dual phase stainless steel generally contains the austenite phase, which is low in yield strength at ordinary temperature. For this reason, in order to provide high yield strength needed for oil well or geothermal well applications in addition to high corrosion resistance performance, the solid solution heat treatment needs to be followed with dislocation strengthening by cold drawing or cold pilgering. While these cold working processes are able to provide high axial tensile yield strength sufficient for oil well and gas well applications, these processes cannot provide simultaneously the strength characteristics needed for the threaded portions used for make-up. That is, conventional cold drawing and cold pilgering act to reduce the wall thickness, or to stretch the pipe in axial direction by drawing the pipe, and the deformation that stretches the pipe along the pipe axis increases the yield strength of the product steel pipe in a direction of stretch along the pipe axis. However, the process produces the Bauschinger effect, which greatly decreases the yield strength for a deformation in a direction opposite to the direction of the final deformation of the metal material. That is, conventional cold working decreases the axial compressive yield strength of a steel pipe, though the process provides the axial tensile yield strength needed for oil wells and gas wells or geothermal well applications. A steel pipe obtained by using conventional cold working therefore undergoes plastic deformation as a result of axial compressive stress acting on the threaded portion or torque shoulder portion in a thread make-up operation inevitably involved in mining of oil wells. This has created drawbacks, including decrease of corrosion resistance due to broken passive films, and a structural functional loss as the threaded joint.

In consideration of these circumstances, PTL 1 suggests the effectiveness of a low-temperature heat treatment against decrease of compressive yield strength at the thread make-up portion due to the Bauschinger effect, in the event where such decrease needs to be reduced. In Examples of PTL 1, a heat treatment is carried out at 350° C. or 450° C. for all conditions, in order to satisfy the desired characteristics. However, the cold working intended for providing strength facilitates diffusion of elements by introducing large numbers of dislocations to the material. While this enables the heat treatment to diffuse elements even when carried out at low temperatures and for brief duration, it may not be possible to create a state important for corrosion resistance performance, that is, a solid-solution state of corrosion resistant elements in steel.

To investigate, the present inventors conducted detailed studies to examine the influence of low-temperature heat treatment on corrosion resistance performance, and how the heat treatment brings about changes in a solid-solution state of corrosion resistant elements in steel. First, the present inventors prepared dual phase stainless steels of S32550 and S32707 that meet the UNS specifications, and performed the cold working necessary for improving the strength of a seamless steel pipe for oil country tubular goods. The axial tensile yield strength was adjusted to at least 125 ksi. The stainless steels were then subjected to a hydrogen sulfide stress corrosion test in a hydrogen sulfide environment after cold working, in an as-processed form, and after a 1-hour heat treatment at 300° C., 450° C., and 550° C. The as-processed stainless steels and the heat treated stainless steels were also subjected to microstructure observation to examine the solid solution state of elements. The stress corrosion cracking state was evaluated by applying a stress 90% of the tensile yield stress, using a corrosion solution prepared by adding $H_2S$ gas to an aqueous solution of 20% NaCl+0.5% $CH_3COOH+CH_3COONa$ under 0.01 to 0.10 MPa pressure, and adjusting the pH to 3.0 to 4.5 (test temperature=25° C.) For microstructure observation, a STEM (Scanning Transmission Electron Microscope) was used to observe the ferrite phase and grain boundaries formed by the ferrite phase, and the austenite phase and grain boundaries formed by the austenite phase, and the distributions of precipitates and chemical elements were quantitatively analyzed. The corrosion test revealed that test specimens in an as-processed form after cold working did not have corrosion. In contrast, test specimens subjected to a brief heat treatment had crack- or corrosion-induced stains observed on material surface in the vicinity of grain boundaries, regardless of the heat treatment conditions. The test results confirmed that the heat treatment, even at low temperatures and for brief duration, has adverse effects on corrosion resistance performance.

The ferrite phase and austenite phase were observed for precipitates, using a STEM. In test specimens tested under low-temperature heat treatment conditions, formation of carbonitrides produced by binding of corrosion resistant elements Cr, Mo, and W to C and N was confirmed within grains and at the grain boundaries, though the amount was small. This differed from the state observed for the as-processed test specimens after cold working, specifically, a solid-solution state of corrosion resistant elements in steel. It is believed that the carbonitrides provide initiation points of corrosion, and that consumption of corrosion resistant elements leads to a corrosion resistance performance drop.

The distribution of chemical elements was quantitatively analyzed for the interface between ferrite phase and austenite phase, using a STEM. The result confirmed segregation of molybdenum at grain boundaries under all low-temperature heat treatment conditions. Specifically, segregation of molybdenum was confirmed at grain boundaries contacting the ferrite phase, and at grain boundaries contacting the austenite phase, specifically, ferrite-austenite grain boundaries, ferrite-ferrite grain boundaries, or austenite-austenite grain boundaries. Because molybdenum is a substitutional element, it is thought that this element slowly diffuses in thermal diffusion, or hardly diffuses at the low temperature of low-temperature heat treatment. The results of these investigations revealed that diffusion of corrosion resistant element molybdenum occurs even in a low-temperature heat treatment, and that this creates areas of high molybdenum concentrations in a localized fashion. In an as-processed form after cold working, the stainless steel showed only little segregation of molybdenum at ferrite phase grain boundaries, and maintained the state after the solid solution heat treatment, that is, a solid-solution state of corrosion resistant elements in steel.

From these results, the present inventors found that, after the introduction of large numbers of dislocations by cold working, diffusion of corrosion resistant element molybdenum occurs even in a brief, low-temperature heat treatment, and that this creates areas of high molybdenum concentrations in a localized fashion. These findings led to the conclusion that the localized concentration of molybdenum lowers the concentration of this element in nearby areas, and creates an initiation point of corrosion, setting a condition for a corrosion resistance performance drop.

Though the detailed mechanism of molybdenum segregation remains somewhat unclear, the present inventors have proposed several possible explanations. One explanation is the supersaturation of the ferrite phase and austenite phase with molybdenum after the solid solution heat treatment, and the influence of large numbers of dislocations introduced in cold working. Another explanation is that materials rich in Cr and Mo have embrittlement phases ($\sigma$ phase, $\chi$ phase, PI phase, Laves phase, $M_3P$) that are thermodynamically stable at temperatures below the temperature of the solid solution heat treatment, including the temperature of low-temperature heat treatment, and, because these embrittlement phases are intermetallic compounds or precipitates containing molybdenum, even in a low-temperature heat treatment, are able to concentrate by attracting to one another at grain boundaries, where diffusion can easily take place.

A dual phase stainless steel requires a solid solution heat treatment before use as a product, and a low-temperature heat treatment creates thermodynamically stable embrittlement phases and precipitates containing molybdenum, even in a dual phase stainless steel containing Cr and Mo. Following these mechanisms, a Mo-containing stainless steel having a dual phase structure likely undergoes a corrosion resistance performance drop when subjected to a low-temperature heat treatment at temperatures below the temperature of the solid solution heat treatment. Conceivably, a prolonged low-temperature heat treatment facilitates element diffusion even further, and adversely affects the corrosion resistance performance by causing further segregation of molybdenum and more formation of intermetallic compounds.

That is, with the method of PTL 1 using low-temperature heat treatment, it is not possible to create the state necessary for achieving desirable corrosion resistance performance, that is, a solid-solution state of corrosion resistant elements in steel, and the corrosion resistance performance needed for seamless steel pipes intended for oil wells and gas wells or geothermal well applications seriously deteriorates. Indeed, with the technique disclosed in PTL 1, it is very difficult to satisfy both the strength characteristics needed for the threaded portions to be used for mining of oil wells and gas wells and for geothermal well applications, and the corrosion resistance performance needed in these applications at the same time.

Aspects of the present invention were completed on the basis of these findings, and are as follows.

[1] A stainless steel seamless pipe of a stainless steel having a composition comprising, in mass %, Cr: 11.5 to 35.0%, and Mo: 0.5 to 6.0%, and including ferrite and austenite, the stainless steel seamless pipe having a ferrite grain boundary and/or a ferrite-austenite grain boundary with a Mo concentration (mass %) that is at most 4.0 times the intragranular Mo concentration (mass %) of ferrite, or an austenite grain boundary with a Mo concentration (mass %) that is at most 4.0 times the intragranular Mo concentration (mass %) of austenite, the stainless steel seamless pipe having an axial tensile yield strength of 689 MPa or more, and an axial compressive yield strength/axial tensile yield strength ratio of 0.85 to 1.15.

[2] The stainless steel seamless pipe according to [1], which has a circumferential compressive yield strength/axial tensile yield strength ratio of 0.85 or more.

[3] The stainless steel seamless pipe according to [1] or [2], wherein the composition further comprises, in mass %, C: 0.08% or less, Si: 1.0% or less, Mn: 10.0% or less, Ni: 15.0% or less, and N: less than 0.400%, and the balance is Fe and incidental impurities.

[4] The stainless steel seamless pipe according to anyone of [1] to [3], wherein the composition further comprises, in mass %, one or two or more selected from W: 6.0% or less, Cu: 4.0% or less, V: 1.0% or less, and Nb: 1.0% or less.

[5] The stainless steel seamless pipe according to anyone of [1] to [4], wherein the composition further comprises, in mass %, one or two selected from Ti: 0.30% or less, and Al: 0.30% or less.

[6] The stainless steel seamless pipe according to anyone of [1] to [5], wherein the composition further comprises, in mass %, one or two or more selected from B: 0.010% or less, Zr: 0.010% or less, Ca: 0.010% or less, Ta: 0.30% or less, Sb: 0.30% or less, Sn: 0.30% or less, and REM: 0.010% or less.

[7] The stainless steel seamless pipe according to anyone of [1] to [6], wherein the stainless steel seamless pipe comprises pipe end portions at least one of which has a make-up portion for an external thread or an internal thread, and the make-up portion has a curvature radius of 0.2 mm or more for a corner formed by a flank surface of the make-up portion and a bottom surface of a thread root of the make-up portion.

[8] The stainless steel seamless pipe according to [7], wherein the make-up portion has a metal-to-metal seal portion and a torque shoulder portion.

[9] A method for manufacturing a stainless steel seamless pipe of any one of [1] to [8], the method comprising cold circumferential bending and rebending after a solid solution heat treatment.

[10] The method for manufacturing a stainless steel seamless pipe according to [9], wherein a workpiece in the cold circumferential bending and rebending has a highest reachable temperature of 300° C. or less, and a retention time of 15 minutes or less at the highest reachable temperature.

Aspects of the present invention can provide a stainless steel seamless pipe having excellent corrosion resistance and high axial tensile yield strength, and having a small difference between its axial tensile yield strength and axial compressive yield strength. The stainless steel seamless pipe according to aspects of the present invention enables use in severe corrosive environments, and makes threads make up operation easier in constructing an oil well or a gas well. Aspects of the present invention also permit easier design for the shape of a thread make-up portion.

BRIEF DESCRIPTION OF THE DRAWINGS

FIG. 1 is a schematic view showing Mo concentration measurement regions.

FIG. 2 shows schematic views representing circumferential bending and rebending.

FIG. 3 shows axial cross sectional views of make-up portions of an external thread and an internal thread (cross sectional views parallel to axial direction), with (a) representing a trapezoidal thread, and (b) representing a triangular thread.

FIG. 4 shows axial cross sectional views of threaded joints (cross sectional views parallel to axial direction), with (a) representing an API threaded joint, and (b) representing a premium joint.

FIG. 5 shows a schematic view near the nose portion, an extension of a pin, with (a) showing a cross sectional view of a pin and a coupling make-up portion taken parallel to pipe axis direction, and (b) showing a torque shoulder portion at the tip of the pin as viewed from the front.

DETAILED DESCRIPTION OF EMBODIMENTS OF THE INVENTION

The following describes embodiments of the present invention. In the following, "%" means "mass %", unless otherwise specifically stated.

A stainless steel seamless pipe according to aspects of the present invention is a stainless steel comprising, in mass %, Cr: 11.5 to 35.0%, and Mo: 0.5 to 6.0%, and including ferrite and austenite, the stainless steel seamless pipe having a ferrite grain boundary and/or a ferrite-austenite grain boundary with a Mo concentration (mass %) that is at most 4.0 times the intragranular Mo concentration (mass %) of ferrite, or an austenite grain boundary with a Mo concentration (mass %) that is at most 4.0 times the intragranular Mo concentration (mass %) of austenite. Cr is an essential element that defines the stainless steel. This element prevents dissolution of iron component by strengthening the passive film, and inhibits reduction of material weight and reduction of wall thickness. Mo is important for inhibiting pitting corrosion, which becomes most problematic when stress is applied in a corrosive environment. In a seamless steel pipe of dual phase stainless steel, it is important that these two elements have a solid-solution state in steel, and be evenly distributed in the steel so that the material surface does not have areas of low Cr and Mo concentrations, that is, areas of weak corrosion resistance performance.

Cr: 11.5 to 35.0%

Cr is the most important element. Cr strengthens the passive film of steel, and improves the corrosion resistance performance. Cr needs to be contained in an amount of at least 11.5% to provide a dual phase structure and corrosion resistance performance for the dual phase stainless steel seamless pipe. Cr is the most basic element that stabilizes the passive film, and a stronger passive film can be formed by increasing the Cr concentration. That is, the contribution of this element for improvement of corrosion resistance increases with increasing Cr contents. However, a Cr content of more than 35.0% causes the embrittlement phases to precipitate in the process of solidifying the molten steel, and produces cracks throughout the solid structure. This poses problems in forming a pipe in subsequent processes. For this reason, the upper limit of Cr content is 35.0%. In view of satisfying both corrosion resistance and manufacturability, the preferred Cr content is 20 to 28%.

Mo: 0.5 to 6.0%

Mo increases the pitting corrosion resistance of steel in proportion to its content. To this end, Mo needs to be evenly present in steel material surfaces exposed to corrosive environments. An excessively high Mo content causes the embrittlement phases to precipitate in the process of solidifying the molten steel, and produces large numbers of cracks throughout the solid structure. This is detrimental to the stability of subsequent pipe formation. For this reason, the upper limit of Mo content is 6.0%. Mo needs to be contained in an amount of at least 0.5% to maintain stable corrosion resistance in sulfide environments. In view of satisfying the corrosion resistance and the manufacture stability needed for the dual phase stainless steel seamless pipe, the preferred Mo content is 1.0 to 5.0%.

Ferrite-Austenite Dual Phase

The following describes the ferrite phase and austenite phase with regard to the appropriate fractions of these two phases in a product. The fractions of ferrite phase and austenite phase are important for corrosion resistance. The two phases in the dual phase stainless steel act differently on corrosion resistance, and provide high corrosion resistance by being present in a dual phase in steel. That is, the dual phase stainless steel must have both austenite phase and ferrite phase, and the fractions of these two phases are important for corrosion resistance performance. Because aspects of the present invention provide materials of dual phase stainless steel pipes used in applications requiring corrosion resistance performance, it is important for corrosion resistance to provide an appropriate dual phase fraction state. In accordance with aspects of the present invention, the appropriate dual phase fraction state is preferably a state in which at least the ferrite fraction (volume fraction) in the microstructure of the dual phase stainless steel pipe is 20% or more and 80% or less. For use in environments requiring even higher corrosion resistance, the ferrite phase is preferably 35 to 65%, in accordance with ISO 15156-3. The remainder structure is preferably the austenite phase.

Ferrite Grain Boundary and/or Ferrite-Austenite Grain Boundary Have a Mo Concentration (mass %) that is at most 4.0 Times the Intragranular Mo Concentration (mass %) of Ferrite, or Austenite Grain Boundary Has a Mo Concentration (mass %) that is at most 4.0 Times the Intragranular Mo Concentration (mass %) of Austenite In a dual phase stainless steel subjected to a low-temperature heat treatment, segregation of Mo occurs in the ferrite phase or in austenite grain boundaries. In accordance with aspects of the present invention, in order to obtain desirable corrosion resistance performance, a ferrite grain boundary and/or a ferrite-austenite grain boundary need to have a Mo concentration (mass %) that is at most 4.0 times the intragranular Mo concentration (mass %) of ferrite, or an austenite grain boundary needs to have a Mo concentration (mass %) that is at most 4.0 times the intragranular Mo concentration (mass %) of austenite. In accordance with aspects of the present invention, "ferrite grain boundary" means a boundary formed by adjacent ferrite grains, "ferrite-austenite grain boundary" means a boundary formed by adjacent ferrite and austenite grains, and "austenite grain boundary" means a boundary formed by adjacent austenite grains.

Desirable corrosion resistance performance can be maintained when the ferrite grain boundary and/or ferrite-austenite grain boundary have a Mo concentration (mass %) that is at most 4.0 times the intragranular Mo concentration (mass %) of ferrite, or the austenite grain boundary has a Mo concentration (mass %) that is at most 4.0 times the intragranular Mo concentration (mass %) of austenite. The corrosion resistance performance can further improve when the Mo concentration ratio is 2.5 or less. Superior corrosion resistance performance can be stably obtained when the Mo concentration ratio is confined within a range of 0.8 to 2.0, taking into account variation in the distribution of element concentration.

The Mo concentration can be measured by using, for example, a STEM. Because the Mo concentration in the vicinity of grain boundaries is unstable, the intragranular Mo concentration can be calculated by excluding data from regions 0 to 50 nm away from the edge of a grain boundary. For example, as shown in FIG. 1, with regard to a measurement region for the intragranular Mo concentration, the measurement region may be 100 nm away from the edge of a grain boundary or 200 nm away from the edge of the grain boundary in a horizontal direction (a direction that is perpendicular to the grain boundary and that corresponds to a horizontal direction in FIG. 1).

When the measurement region is 100 nm away from the edge of the grain boundary or 200 nm away from the edge of the grain boundary, a vertical direction (a direction that is parallel to the grain boundary and that corresponds to a vertical direction in FIG. 1) of the region is not particularly limited. The grain boundary measurement region (vertical and horizontal) is not particularly limited either. The Mo concentration is measured for these predetermined regions in a predetermined pitch. The concentration can be quantitatively evaluated using various methods, for example, by counting mass %. In this case, calculations may be made by dividing the maximum value of mass % of Mo on a ferrite (phase) grain boundary (peak value, maximum value of mass %) by the mean value of mass % of intragranular Mo concentration of ferrite (phase), and the calculated value (peak value/mean value) may be defined as the amount of Mo segregation. Aside from the measurement of Mo concentration using STEM, an element analysis using a scanning electron microscope or transmission electron microscope may be used for confirmation of Mo concentration.

In accordance with aspects of the present invention, "grain boundary" is a grain boundary with a misorientation angle of 15° or more. The misorientation angle can be confirmed using a STEM or TEM. Misorientation analysis using the EBSD (electron backscatter diffraction) method also can be used for easy confirmation of misorientation angle.

Preferably, the stainless steel seamless pipe according to aspects of the present invention further comprises, in mass %, C: 0.08% or less, Si: 1.0% or less, Mn: 10.0% or less, Ni: 15.0% or less, and N: less than 0.400%. In the following, the content of each element in the steel composition is in "mass %", and is shown simply as "%", unless otherwise specifically stated.

C: 0.08% or Less

Carbon deteriorates corrosion resistance. The upper limit of C content is preferably 0.08% to obtain appropriate corrosion resistance performance. There is no particular need to set the lower limit. However, the C content is preferably 0.005% or more because an excessively low C content increases the decarburization cost of melting.

Si: 1.0% or Less

Excessively high Si contents are detrimental to workability and low-temperature toughness. For this reason, the upper limit of Si content is preferably 1.0%. Preferably, the Si content is 0.01% or more because this element has a deoxidation effect in steel, and is effective when contained in molten steel in appropriate amounts. In view of providing a sufficient deoxidation effect and reducing the side effects of excess silicon residues in steel, the Si content is more preferably 0.2 to 0.8%.

Mn: 10.0% or Less

Mn decreases low-temperature toughness when contained in excessively large amounts. For this reason, the Mn content is preferably 10.0% or less. Mn is also a strong austenite phase-forming element, and is less expensive than other austenite phase-forming elements. Mn also effectively acts to neutralize sulfur, an impurity element that becomes included in the molten steel. When added in trace amounts, Mn also has the effect to fix sulfur by forming MnS, preventing the steel from serious decrease of corrosion resistance and toughness due to sulfur. For this reason, Mn is contained in an amount of preferably 0.01% or more. The Mn content is more preferably 2.0 to 8.0% when the benefit of Mn as an austenite phase-forming element needs to be more fully exploited to reduce cost while taking caution for decrease of low-temperature toughness. The Mn content is more preferably less than 1.0%, when low-temperature toughness is needed.

Ni: 15.0% or Less

Ni is most expensive of the austenite phase-forming elements, and increased Ni contents mean increased manufacturing costs. It is therefore preferable not to contain Ni in large amounts. For this reason, the upper limit of Ni content is preferably 15.0%. Ni is also a strong austenite phase-forming element, and improves the low-temperature toughness of steel. Ni should therefore be actively used when low-temperature toughness is of concern in using less expensive austenite phase-forming element Mn. The lower limit of Ni content is preferably 0.5%. In applications where low-temperature toughness is not of concern, Ni is more preferably added with other elements within a content range of 0.5 to 5.0% or less. When low-temperature toughness is needed, it is effective to actively add Ni, preferably in a 5 to 13% range.

N: Less than 0.400%

N itself is an inexpensive element; however, it takes time to add Ni in excessively large amounts, and this requires special equipment, which leads to increasing manufacturing cost. For this reason, the N content is preferably less than 0.400%. N is also a strong austenite phase-forming element, aside from being inexpensive. N is also useful because it improves corrosion resistance performance and strength by dissolving in steel in the form of a solid solution. The N content is not particularly limited, as long as N and other austenite phase-forming elements are able to provide appropriate dual phase fractions in the microstructure of a product. However, when the N content is too low, melting and refining of steel require a high degree of vacuum, and the type of usable raw material will be limited. For this reason, the N content is preferably 0.010% or more.

Aspects of the present invention may optionally contain the following elements, as appropriate.
One or Two or More Selected from W: 6.0% or Less, Cu: 4.0% or Less, V: 1.0% or Less, and Nb: 1.0% or Less
W: 6.0% or Less As is molybdenum, tungsten is an element that increases the pitting corrosion resistance in proportion to its content. However, when contained in excess amounts, tungsten impairs the workability of hot working, and damages production stability. For this reason, tungsten, when contained, is contained in an amount of at most 6.0%. There is no particular need to set the lower limit of W content. It is, however, preferable to add tungsten in an amount of 0.1% or more, in order to stabilize the corrosion resistance performance of the dual phase stainless steel seamless pipe. From the viewpoint of the corrosion resistance and production stability needed for the dual phase stainless steel seamless pipe, the W content is more preferably 1.0 to 5.0%.
Cu: 4.0% or Less Cu is a strong austenite phase-forming element, and improves the corrosion resistance of steel. It is therefore desirable to make active use of Cu when sufficient corrosion resistance cannot be provided by other austenite phase-forming elements, Mn and Ni. On the other hand, when contained in excessively large amounts, Cu leads to decrease of hot workability, and forming becomes difficult. For this reason, Cu, when contained, is contained in an amount of 4.0% or less. The Cu content does not particularly require the lower limit. However, Cu can produce a corrosion resistance improving effect when contained in an amount of 0.1% or more. From the viewpoint of satisfying both corrosion resistance and hot workability, the Cu content is more preferably 1.0 to 3.0%.
V: 1.0% or Less The V content is preferably 1.0% or less because excessively high V contents are detrimental to low-temperature toughness. Adding V is also effective at improving strength. It is therefore possible to make use of V when more strength is needed. The strength improving effect can be obtained with a V content of 0.01% or more. For this reason, when V is contained, the V content is preferably 0.01% or more. V is an expensive element, and, considering the strength improving effect it produces and the cost of adding this element, the more preferred V content is 0.05 to 0.40%.
Nb: 1.0% or Less The Nb content is preferably 1.0% or less because excessively high Nb contents are detrimental to low-temperature toughness. Adding Nb is also effective at improving strength. It is therefore possible to make use of Nb when more strength is needed. The strength improving effect can be obtained with a Nb content of 0.01% or more. For this reason, when Nb is contained, the Nb content is preferably 0.01% or more. As is V, Nb is also an expensive element, and, considering the strength improving effect it produces and the cost of adding this element, the more preferred Nb content is 0.05 to 0.40%.

Aspects of the present invention may optionally contain the following elements, as appropriate.
One or Two Selected from Ti: 0.30% or Less, and Al: 0.30% or Less
Ti: 0.30% or Less The Ti content is preferably 0.30% or less because increased Ti contents decrease the low-temperature toughness of the product. Ti enables refinement of the solidified microstructure, and fixing of excess C and N, and can be appropriately used when there is a need to control the microstructure or adjust the chemical components. When Ti is contained, these effects can be obtained with a Ti content of 0.0001% or more. In view of controlling the microstructure or chemical components and providing product characteristics, the more preferred Ti content is 0.0010 to 0.10%.
Al: 0.30% or Less Al is detrimental to toughness when this element remains in excessively large amounts in the product. For this reason, Al, when contained, is contained in an amount of preferably 0.30% or less. Al is effective as a deoxidizing agent for refining. When contained, this effect can be obtained with an Al content of 0.01% or more.

Aspects of the present invention may also optionally contain the following elements, as appropriate.
One or Two or More Selected from B: 0.010% or Less, Zr: 0.010% or Less, Ca: 0.010% or Less, Ta: 0.30% or Less, Sb: 0.30% or Less, Sn: 0.30% or Less, and REM: 0.010% or Less When added in large amounts, B, Zr, Ca, and REM impair hot workability, and the alloying cost increases because these are rare elements. The upper limit of each content is therefore preferably 0.010% for B, Zr, Ca, and REM. When added in trace amounts, B, Zr, Ca, and REM improve bonding at grain boundaries. Trace amounts of these elements alter the form of surface oxides, and improve workability and formability of hot working. Typically, a dual phase stainless steel seamless pipe is not an easily workable material, and often involves roll marks and shape defects that depend on the extent and type of working. B, Zr, Ca, and REM are effective when the pipe forming conditions involve such problems. The contents of these elements do not particularly require lower limits. However, when contained, B, Zr, Ca, and REM can produce the workability and formability improving effect with contents of 0.0001% or more. Excess addition of Ta increases the alloying cost, and the upper limit of Ta is preferably 0.30% when containing this element. When added in small amounts, Ta inhibits transformation into an embrittlement phase, and, at the same time, improves the hot workability and corrosion resistance. Ta is also effective when embrittlement phases persist for a prolonged time period in a stable temperature region in hot working and subsequent cooling. For this reason, Ta, when contained, is contained in an amount of 0.0001% or more. Formability decreases with increasing amounts of Sb and Sn. For this reason, the upper limit of Sb and Sn contents is preferably 0.30% when containing these elements. When added in small amounts, Sb and Sn improve corrosion resistance. For this reason, Sb and Sn, when contained, are contained in an amount of 0.0003% or more.

The balance is Fe and incidental impurities.

A stainless steel seamless pipe according to aspects of the present invention has an axial tensile yield strength of 689 MPa or more. Typically, a dual phase stainless steel has a microstructure with the soft, austenite phase. Because of this, the axial tensile yield strength cannot reach 689 MPa in the state after a solid-solution heat treatment. An axial tensile yield strength of 689 MPa or more can be achieved by dislocation strengthening using the cold working described above (circumferential bending and rebending). Higher axial tensile yield strengths are more advantageous in terms of cost because it enables thinner pipe wall design for mining well applications. However, overly high axial tensile yield strengths have adverse effects on mechanical characteristics, including serious decrease of low-temperature toughness. For this reason, the axial tensile yield strength is desirably 1,033.5 MPa, at the highest.

In accordance with aspects of the present invention, the ratio of axial compressive yield strength and axial tensile yield strength (axial compressive yield strength/axial tensile yield strength) is 0.85 to 1.15. With an axial compressive yield strength/axial tensile yield strength ratio of 0.85 to 1.15, the pipe is able to withstand higher axial compressive stress occurring during the make-up of threads or when the steel pipe bends in the well. Such a stainless steel pipe is also able to withstand the thermal stress due to high temperature, or axial compressive stress occurring when the steel pipe is forced into the ground in a directional well or horizontal well. This makes it possible to reduce the wall thickness required to withstand compressive stress. Improved freedom of design of pipe wall thickness, particularly, the wider range in which the wall thickness can be reduced means reduced material costs, and this enables cost reduction and an increased volume of production.

In accordance with aspects of the present invention, the ratio of circumferential compressive yield strength and axial tensile yield strength (circumferential compressive yield strength/axial tensile yield strength) is preferably 0.85 or more. Given the same pipe wall thickness, the minable depth of a well depends more on the axial tensile yield stress. In order to prevent crushing of a pipe under the external pressure generated in a deep well, it is preferable that the ratio of circumferential compressive yield strength with respect to axial tensile yield stress be 0.85 or more. The ratio of circumferential compressive yield strength with respect to axial tensile yield stress typically becomes saturated when it reaches a value as large as about 1.50, though this does not particularly pose a problem when the circumferential compressive yield strength is greater than the axial tensile yield strength. An overly large strength ratio has adverse effects on other mechanical characteristics, such as, for example, large decrease of circumferential low-temperature toughness compared to axial low-temperature toughness. For this reason, the strength ratio is confined within a range of more preferably 0.85 to 1.25.

In accordance with aspects of the present invention, austenite grains separated by a misorientation angle of 15° or more in an axial wall-thickness cross section (a wall thickness direction of a pipe cross section taken parallel to the pipe axis) have an aspect ratio of preferably 9 or less. Preferably, austenite grains having an aspect ratio of 9 or less have an area fraction of 50% or more. A stainless steel according to aspects of the present invention is adjusted to have an appropriate ferrite phase fraction with the temperature of a solid solution heat treatment. Here, by undergoing recrystallization in hot working or heat treatment, inside of the remaining austenite phase turns into a microstructure containing crystal grains separated by an misorientation angle of 15° or more. This produces austenite grains having a small aspect ratio. In such a state, the stainless steel seamless pipe does not have the axial tensile yield strength needed for use as oil country tubular goods or for geothermal well applications, and the axial compressive yield strength/axial tensile yield strength ratio takes a value close to 1. Conventionally, in order to provide the axial tensile yield strength needed for use as oil country tubular goods or for geothermal well applications, the pipe is subjected to axial drawing (cold drawing, cold pilgering), and this creates changes in the axial compressive yield strength/axial tensile yield strength ratio and in the aspect ratio of austenite grains. That is, the aspect ratio of austenite grains and the axial compressive yield strength/axial tensile yield strength ratio are closely related to each other. Specifically, while the cold rolling increases the yield strength in a direction of elongation of austenite grains in an axial wall-thickness cross section (a wall thickness direction of a pipe cross section taken parallel to the pipe axis), the yield strength decreases in the opposite direction because of the Bauschinger effect, and this increases the difference in axial compressive yield strength/axial tensile yield strength. It can be seen from this that, by selecting cold working that controls and reduces the aspect ratio of austenite grains before and after the process, it is possible to obtain a steel pipe having less anisotropy in axial strength, and that provides superior strength characteristics for the threaded joint portion.

In accordance with aspects of the present invention, a steel pipe having small strength anisotropy can be obtained when the aspect ratio of austenite grains is 9 or less. A steel pipe having small strength anisotropy can be stably obtained when the austenite grains having an aspect ratio 9 or less have an area fraction of 50% or more. A steel pipe having small strength anisotropy can be obtained even more stably when the aspect ratio is 5 or less. Because the strength anisotropy can have smaller values with smaller aspect ratios, the lower limit of aspect ratio is not particularly limited, and the aspect ratio is preferably closer to 1. The aspect ratio of austenite grains can be determined by, for example, observing austenite phase grains having a misorientation angle of 15° or more in a crystal orientation analysis of an axial wall-thickness cross section, and finding the ratio of the longer side and the shorter side of a rectangle confining the grains. Austenite grains of small grain sizes involve large measurement errors, and an error may occur in the aspect ratio when austenite grains of small grain sizes are contained. It is therefore preferable that austenite grains to be used for aspect ratio measurement have a diameter of at least 10 μm as measured for a true circle constructed from the measured grains and having the same area as the measured austenite grains.

A microstructure having a small austenite-grain aspect ratio in an axial wall-thickness cross section can be stably obtained by circumferential bending and rebending. Circumferential bending and rebending does not involve deformation of austenite grains due to reduction of wall thickness or elongation, and enables cold working without varying the aspect ratio. The strength anisotropy can be made even smaller when the area fraction of austenite grains having an aspect ratio of 9 or less is controlled to be 50% or more.

The aspect ratio of ferrite phase is not particularly limited. This is because the austenite phase has smaller yield strength, and is more influential on the Bauschinger effect after working.

A threaded joint is constructed from a pin having an external thread, and a box having an internal thread. Aside from the standard threaded joints specified by the API (The American Petroleum Institute), other variations of threaded joints include special types of high-performance threaded joints, called premium joints, that include a metal-to-metal seal portion and a torque shoulder portion, in addition to the threaded portion. In order to make a tight joint, a threaded portion is typically designed so that the contact surface pressure acts radially on the thread, and, for example, a tapered thread is used for this purpose. The radial surface pressure causes the pin (the external thread side) to axially elongate by undergoing deformation that reduces the diameter, and the box (the internal thread side) to axially contract by undergoing deformation that expands the box diameter. This creates contact surface pressure on flank surfaces at the ends of the threaded portions. That is, the thread receives axial compressive stress in a manner that depends on the make-up force. It is therefore important to provide axial compressive yield strength that can withstand such compressive stress. In premium joints, a large axial compressive stress generates at torque shoulder portions. Materials having high axial compressive yield strength are therefore important for preventing plastic deformation of torque shoulder portions.

A stainless steel seamless pipe according to aspects of the present invention has superior compressive resistance, and can be used for threaded joints that are directly joined to other steel pipes (integral joints), or threaded joints that are joined via couplings (T & C joints). In a make-up portion of threads, axial tension and compressive stress occur as a result of bending deformation during and after make-up. By applying a stainless steel seamless pipe according to aspects of the present invention to threaded joints, the present invention can achieve a threaded joint that can maintain high corrosion resistance performance and high threaded joint quality.

FIG. 3 shows axial cross sectional views of make-up portions of an external thread and an internal thread (cross sectional views parallel to axial direction), schematically showing thread make-up portions with corners having curvature radius R. FIG. 3(a) and FIG. 3(b) represent a trapezoidal thread and a triangular thread, respectively. In accordance with aspects of the present invention, it is preferable that an external or internal thread make-up portion be provided at least one of the pipe end portions, and that a corner formed by a flank surface and the bottom surface of the thread root in the make-up portion have a curvature radius of 0.2 mm or more. That is, in accordance with aspects of the present invention, the fatigue characteristics can be improved while maintaining high corrosion resistance performance when a corner R formed by a flank surface and the bottom surface of the thread root has a curvature radius of 0.2 mm or more, regardless of the type of thread. Here, the flank surface is a surface where the external and internal threads make contact upon make-up, and where pressure is exerted upon by make-up. In an external thread (pin), the slant surface of the thread closer to the pipe end is herein called stabbing flank surface, and the slant surface of the thread away from the pipe end is herein called load flank surface. In an internal thread (box), the slant surface of the thread opposite the stabbing flank surface of a pin is herein called stabbing flank surface, and the slant surface of the thread opposite the load flank surface of a pin is herein called load flank surface.

FIG. 4 shows axial cross sectional views of threaded joints (cross sectional views parallel to axial direction). FIG. 4(a) and FIG. 4(b) represent an API threaded joint and a premium joint, respectively. In a threaded joint configured solely from threaded portions as in the API threaded joint, the maximum surface pressure occurs at the ends of the threaded portions upon make-up of the threads, and the threaded portion on the tip side of the pin makes contact at the stabbing flank surface, whereas the threaded portion on the back side of the pin makes contact at the load flank surface. The reactive force by the torque shoulder portion also needs to be considered in the case of a premium joint.

In a premium joint, the maximum surface pressure occurs at the load flank surfaces at the ends of the threaded portions upon make-up of the threads. Conventionally, the axial compressive yield strength is smaller than the axial tensile yield strength because of the Bauschinger effect acting along the pipe axis direction, and, because of the low compressive yield strength, compressive stress generated in areas of concentrated stress easily produces microscopic deformation, and reduces the fatigue life. Techniques are available that perform a low-temperature heat treatment to reduce the Bauschinger effect. However, a low-temperature heat treatment cancels the solid-solution state of corrosion resistant elements in steel, and high corrosion resistance performance cannot be obtained. That is, corrosion resistance and the fatigue characteristics of threaded portions cannot be improved at the same time. In accordance with aspects of the present invention, because the corner R has a curvature radius of 0.2 mm or more, the stainless steel seamless pipe can have threaded portions with improved fatigue characteristics while providing desirable corrosion resistance performance at the same time.

Providing a curvature radius of more than 0.2 mm for the corner R is effective at further relieving stress concentration. However, a large corner R has the possibility of making the design of threaded portions less flexible, and may impose restriction on the size of steel pipe that can be threaded, or designing itself. Larger corners R also mean smaller flank surface areas of external and internal threads brought into contact with each other. This leads to reduced sealability or reduced make-up force. For these reasons, the corner R is preferably 0.2 to 3.0 mm. The area of flank surface, which decreases with increase of the size of corner R, should be defined in relation to the height of the thread crest so that the corner R, with a curvature radius of at least 0.2 mm, should be designed to account for less than 20% of the radial length (a length in the radial direction from the center of pipe axis) of the thread height.

FIG. 4(b) is a schematic view of a premium joint having a metal-to-metal seal portion and a torque shoulder portion, in addition to a threaded portion. The metal-to-metal seal portion (Seal in FIG. 4(b)) shown in FIG. 4(b) warrants sealability for the pipe after make-up. The torque shoulder portion (Shoulder in FIG. 4(b)) serves as a stopper when tightening the pipe, and has an important role in warranting a stable position for the tightened pipe. The torque shoulder portion experiences high compressive stress when tightening the pipe. Deformation of the torque shoulder portion under high compressive stress is problematic because, in this case, the joint is no longer able to provide high sealability, or the inner diameter becomes smaller as a result of inward deformation. To prevent such deformation of torque shoulder portion, the wall thickness needs to be increased to improve compressive strength. In this case, however, design of a thin steel pipe is not possible, or the material will be wasted because of the excessive wall thickness.

A typical make-up operation of threads checks the value of applied torque (the value of the torque applied to tighten the thread), and controls the applied torque so that the torque applied beyond the sealing torque (a torque indicating a sealed state reached, when the torque applied to tighten the thread exceeds a certain reference value) does not exceed the torque above which the torque shoulder portion deforms (the torque shoulder portion deforms, when the torque value exceeds a certain reference value or upper limit).

Here, when the pipe has a weak axial compressive yield strength, a lower value needs to be set for the upper limit of torque value provided to prevent deformation of torque shoulder portion. The narrower control range of torque value means that the thread cannot be tightened in a stable fashion. In accordance with aspects of the present invention, the pipe has desirable axial compressive yield strength, and deformation of torque shoulder portion can be prevented while maintaining high corrosion resistance performance. Deformation of torque shoulder portion can be prevented, and the pipe can be tightened in a stable fashion when the thickness cross sectional area of the torque shoulder portion at the tip of an external thread (the tip of an external thread on the side of a coupling; (Ds1−Ds0)/2), shown in FIG. 5, accounts for at least 25% of the cross sectional area of the raw pipe. The percentage is preferably 25 to 60% because the nose becomes too rigid, and galling may occur in tightening the thread when the thickness of the torque shoulder portion at the tip of the external thread is increased. Preferably, the nose portion has design that further increases the strength of the torque shoulder portion against compression because such design can provide improved torque performance (raises the torque value that can be applied without causing deformation, enabling application of a higher make-up torque). FIGS. 5(a) and 5(b) show schematic views near the nose portion, an extension of a pin. FIG. 5(a) is a cross sectional view of a pin and a coupling make-up portion taken parallel to pipe axis direction. FIG. 5(b) shows a torque shoulder portion at the tip of the pin as viewed from the front. In order to achieve high torque performance, it is desirable to make the ratio x/L 0.01 to 0.1, where x represents the seal point position from the pipe end, and L is the length of the nose forming an unthreaded portion at the tip of the pin. By providing a seal point position in the vicinity of the shoulder portion, the actual cross sectional area of the shoulder portion (the cross sectional area of shoulder portion: $\pi/4 \times (Ds1^2 - Ds0^2)$) increases, and this provides high torque performance. The nose length is preferably no greater than 0.5 inches because the nose rigidity decreases, and the nose cannot withstand a high compressive force when the nose is too long. Desirably, the nose length is at least 0.2 inches because the pin cannot have enough space for the seal portion when the nose is too short. High torque performance cannot be obtained with conventional stainless steels of low axial compressive yield strength. In FIG. 5, δ represents the amount of seal interference, and is defined by the maximum value of overlaps of when drawings are overlaid, Ds1 represents the outer diameter of the shoulder contact area, and Ds0 represent the inner diameter of the shoulder contact area.

Another important characteristic of the threaded portion is sealability, a measure of airtightness. Preferably, the threaded portion satisfies a compression rate of 85% or more in a seal test performed in accordance with ISO 13679:2019. In order to achieve high sealability, it is desirable that the length of the nose forming an unthreaded portion at the tip of the pin be at least 0.3 inches, and that the ratio x/L be 0.2 to 0.5, where x represents the seal point position from the pipe end, and L is the nose length. Desirably, the nose length is at most 1.0 inch because cutting takes time when the nose is unnecessarily long, and an unnecessarily long nose results in unstable performance due to reduced nose rigidity. Conventional duplex stainless steels of low compressive yield strength cannot have long nose design because duplex stainless steels of low compressive yield strength, by itself, cannot tolerate design that involves a thin nose tip.

The following describes a method for manufacturing a stainless steel seamless pipe according to aspects of the present invention.

First, a steel material of the foregoing dual phase stainless steel composition is produced. The process for making the dual phase stainless steel may use a variety of melting processes, and is not limited. For example, a vacuum melting furnace or an atmospheric melting furnace may be used when making the steel by electric melting of iron scrap or a mass of various elements. As another example, a bottom-blown decarburization furnace using an Ar—$O_2$ mixed gas, or a vacuum decarburization furnace may be used when using hot metal from a blast furnace. The molten material is solidified by static casting or continuous casting, and formed into ingots or slabs before being formed into a round billet by hot rolling or forging.

The round billet is heated by using a heating furnace, and formed into a steel pipe through various hot rolling processes. The round billet is formed into a hollow pipe by hot forming (piercing). Various hot forming techniques may be used, including, for example, the Mannesmann process, and the extrusion pipe-making process. It is also possible, as needed, to use, for example, an elongator, an Assel mill, a mandrel mill, a plug mill, a sizer, or a stretch reducer as a hot rolling process that reduces the wall thickness of the hollow pipe, or sets the outer diameter of the hollow pipe.

The process required after the hot forming is a solid solution heat treatment. A solid solution heat treatment is required because air cooling produces various carbonitrides and intermetallic compounds in the steel. That is, in hot rolling, the dual phase stainless steel undergoes a gradual temperature decrease while being hot rolled from the high-temperature state of heating. The dual phase stainless steel is also typically air cooled after hot forming, and temperature control is not achievable because of the temperature history that varies with size and variety of products. This may lead to decrease of corrosion resistance as a result of the corrosion resistant elements being consumed in the form of thermochemically stable precipitates that form in various temperature regions in the course of temperature decrease. There is also a possibility of phase transformation into the embrittlement phase, which leads to serious impairment of low-temperature toughness. The dual phase stainless steel needs to withstand a variety of corrosive environments, and it is important to bring the fractions of austenite phase and ferrite phase to an appropriate dual phase state. However, because the rate of cooling from the heating temperature is not controllable, controlling the fractions of these two phases, which vary in succession with the hold temperature, is difficult to achieve. To address these issues, a solid-solution heat treatment is often performed that involves rapid cooling after hot forming to form a solid solution of the precipitates in steel, and to initiate reverse transformation of embrittlement phase to non-embrittlement phase, and thereby bring the phase fractions to an appropriate dual phase state. In this process, the precipitates and embrittlement phase are dissolved into steel, and the phase fractions are controlled to achieve an appropriate dual phase state. The solid-solution heat treatment is typically performed at a high temperature of 1,000° C. or more, though the temperature that dissolves the precipitates, the temperature that initiates reverse transformation of embrittlement phase, and the temperature that brings the phase fractions to an appropriate dual phase state slightly vary with the types of elements added. In accordance with aspects of the present invention, the solid solution heat treatment temperature is preferably 1,000° C. or more, and is preferably 1, 200° C. or less. The heating is followed by quenching to maintain the solid-solution state. This may be achieved by compressed-air cooling, or by using various coolants, such as mist, oil, and water. It should be noted here when the temperature of the material after the preceding hot rolling is the same as the solid solution heat treatment temperature of the material, the hot rolling is followed by quenching and subsequent solid solution heat treatment is not necessary.

The seamless raw pipe after the solid-solution heat treatment contains the low-yield-strength austenite phase, and, in its as-processed form, cannot provide the strength needed for mining of oil wells and gas wells. This requires strengthening of the pipe by dislocation strengthening, using various techniques. The strength of the dual phase stainless steel seamless pipe after strengthening is graded according to its axial tensile yield strength.

In accordance with aspects of the present invention, the pipe is strengthened by using a method that involves circumferential bending and rebending of pipe, as follows.

Circumferential Bending and Rebending

Cold drawing and cold pilgering are two standardized methods of cold rolling of pipes intended for mining of oil wells and gas wells. Both of these techniques can achieve high strength along a pipe axis direction. These techniques bring changes mostly in rolling reduction and the percentage of outer diameter change until the strength of the required grade is achieved. Another thing to note is that cold drawing and cold pilgering are a form of rolling that reduces the outer diameter and wall thickness of pipe to longitudinally stretch and greatly extend the pipe in the same proportion along the pipe axis. While this easily provide high strength in a direction of stretch along the axis, the process produces a large Bauschinger effect in a direction of compression along the pipe axis, and reduces the axial compressive yield strength by as much as about 20% relative to the axial tensile yield strength. In order to reduce decrease of axial compressive yield strength, PTL 1 performs a low-temperature heat treatment after cold rolling. While this relieves the difference between axial tensile yield strength and axial compressive yield strength, the corrosion resistance performance decreases as a result of segregation of carbonitrides and molybdenum into grain boundaries. Faced with this problem, the present inventors conducted various studies, and devised a novel cold working method as a way of reducing the difference between axial tensile yield strength and axial compressive yield strength to strengthen a seamless steel pipe while maintaining desirable corrosion resistance performance with a solid-solution state of corrosion resistant elements maintained in the steel.

Specifically, aspects of the present invention provide a novel cold working method that takes advantage of dislocation strengthening using circumferential bending and rebending. This working technique is described below, with reference to the accompanying drawing. Unlike cold drawing and cold pilgering that produce a longitudinal strain along a pipe axis direction, the foregoing technique produces strain by bending and flattening of pipe (first flattening), and rebending of pipe that restores full roundness (second flattening), as shown in FIG. 2. In this technique, the amount of strain is adjusted by repeating bending and rebending, or by varying the amount of bend, without greatly changing the initial shape of steel pipe. That is, in contrast to the conventional cold rolling that makes use of axial elongation strain, the hardening process by the cold working according to aspects of the present invention increases the strength of a steel pipe by taking advantage of the circumferential bending strain. This cold working method reduces axial strain, and, in principle, does not involve the Bauschinger effect that occurs along an axial direction in conventional cold rolling methods. Accordingly, the cold working does not require a subsequent low-temperature heat treatment, and can achieve the high axial compressive yield strength needed to provide desirable strength characteristics for the threaded portion, while maintaining a solid-solution state of corrosion resistant elements in steel after the solid solution heat treatment, a condition needed for desirable corrosion resistance performance.

FIG. 2, (a) and (b) show cross sectional views illustrating a tool with two points of contact. FIG. 2, (c) is a cross sectional view showing a tool with three points of contact. Thick arrows in FIG. 2 indicate the direction of exerted force flattening the steel pipe. As shown in FIG. 2, for second flattening, the tool may be moved or shifted in such a manner as to rotate the steel pipe and make contact with portions of pipe that were not flattened by the first flattening (portions flattened by the first flattening are indicated by shadow shown in FIG. 2).

As illustrated in FIG. 2, the circumferential bending and rebending that flattens the steel pipe, when intermittently or continuously applied throughout the pipe circumference, produces strain in the pipe, with bending strain occurring in portions where the curvature becomes the largest, and rebending strain occurring toward portions where the curvature is the smallest. The strain needed to improve the strength of the steel pipe (dislocation strengthening) accumulates after the deformation due to bending and rebending. Unlike the working that achieves reduced wall thickness and reduced outer diameter by compression, a characteristic feature of the foregoing method is that the pipe is deformed by being flattened, and, because this is achieved without requiring large power, it is possible to minimize the shape change before and after work.

A tool used to flatten the steel pipe, such as that shown in FIG. 2, may have a form of a roll. In this case, two or more rolls may be disposed around the circumference of a steel pipe. Deformation and strain due to repeated bending and rebending can be produced with ease by flattening the pipe and rotating the pipe between the rolls. The rotational axis of the roll may be tilted within 90° of the rotational axis of the pipe. In this way, the steel pipe moves in a direction of its rotational axis while being flattened, and can be continuously worked with ease. When using such rolls for continuous working, for example, the distance between the rolls may be appropriately varied in such a manner as to change the extent of flattening of a moving steel pipe. This makes it easy to vary the curvature (extent of flattening) of the steel pipe in the first and second runs of flattening. That is, by varying the roll distance, the moving path of the neutral line can be changed to uniformly produce strain in a wall thickness direction. The same effect can be obtained when the extent of flattening is varied by varying the roll diameter, instead of roll distance. It is also possible to vary both roll distance and roll diameter. With three or more rolls, the pipe can be prevented from whirling around during work, and this makes the procedure more stable, though the system becomes more complex.

In bending and rebending according to aspects of the present invention, regardless of the form of working, the amount of working can be managed with ease by using the minimum diameter Dmin of a deforming steel pipe calculated by doubling the smallest radius of a bending steel pipe having an initial diameter Di, that is, the smallest radius portion from the center of a steel pipe being flattened from two locations under the pressure applied to the outer diameter, or the smallest radius portion from the center of a triangular steel pipe being bent from three locations. The amount of working also can be managed by using ti/Di derived from initial outer diameter Di and initial wall thickness ti because the amount of working is influenced by the initial wall thickness ti relative to the initial outer diameter Di of steel pipe. These parameters can be uniformly determined once the product size and the devices to be used for manufacture are decided. In implementing aspects of the present invention, the products can more stably satisfy the strength characteristics when these parameters are used for management of manufacture conditions. Studies conducted with these parameters to find manufacture conditions that enable stable production revealed that, when two tools are used, stable production with an axial compressive yield strength/axial tensile yield strength ratio of 0.85 to 1.15 is possible when an index obtained by multiplying the ti/Di ratio of initial wall thickness ti and initial outer diameter Di by a value of rolling reduction [%] calculated as (1−Dmin/Di)×100 falls within a range of 0.9 to 2.5. Even more stable production is possible with an index value of 1.0 to 1.6. In the case of three tools, stable production can be achieved over a wider range with an axial compressive yield strength/axial tensile yield strength ratio of 0.85 to 1.15 when the index value is 0.5 to 3.0. Highly stable production is possible with an index value of 0.7 to 2.0.

Unlike PTL 1, the Bauschinger effect does not occur along a pipe axis direction when a seamless steel pipe is strengthened by circumferential bending and rebending. This eliminates the need for a low-temperature heat treatment, and desirable corrosion resistance performance can be obtained by maintaining the solid-solution state of corrosion resistant elements in the steel. As a general rule, because a low-temperature heat treatment is not required, the cold working is not followed by a heat treatment, including a low-temperature heat treatment.

However, even with the circumferential bending and rebending performed as a method of cold working in accordance with aspects of the present invention, an irreversible increase of the temperature of the workpiece could still occur during production, for example, because of the generated heat of cold working producing heat in the workpiece itself during and after the cold working. That is, cold working can still produce the same conditions observed in the low-temperature heat treatment of PTL 1. To prevent this, the temperature after cold working needs to be controlled to avoid undesirable conditions such as that observed in the low-temperature heat treatment of PTL 1. To this end, the present inventors conducted studies of various temperature histories, and found that the solid-solution state of corrosion resistant elements in steel can be maintained when the highest temperature to which the workpiece is exposed after cold working is 300° C. or less and the exposure time is 15 minutes or less. That is, in accordance with aspects of the present invention, the solid-solution state of corrosion resistant elements in steel can be maintained, and segregation of molybdenum can be inhibited when the highest reachable temperature of the workpiece subjected to cold circumferential bending and rebending is 300° C. or less, and the retention time of the workpiece at this temperature is 15 minutes or less. For example, the highest reachable temperature can be appropriately controlled by controlling the work rate (the rate of deformation into a flat shape).

Optionally, the cold working may be followed by a surface treatment such as plating. Preferably, the work conditions with a highest reachable temperature of 300° C. or less and a retention time of 15 minutes or less are satisfied in all steps after the cold working. The conditions of the steps after the cold working, including the temperature of a surface treatment such as plating, can also be appropriately controlled so that the workpiece in these steps also has a highest reachable temperature of 300° C. or less and a retention time at this temperature of 15 minutes or less.

In accordance with aspects of the present invention, a stainless steel seamless pipe obtained in the manner described above can be used to make external and internal threads that are designed to have a curvature radius of 0.2 mm or more for a corner R formed by a flank surface and the bottom surface of the thread root in an axial cross section of the threaded joint portion (a cross section parallel to pipe axis direction). The threads can be provided by cutting or rolling, the former being more preferred for stable formation of a corner R. For improved performance as a threaded joint, it is desirable to adopt a premium joint having a metal-to-metal seal portion and a torque shoulder portion, in addition to the threaded portion. A stainless steel seamless pipe according to aspects of the present invention has high axial compressive yield strength, and can exhibit intended functions as a joint when the shoulder portion has a cross sectional area that is at least 25% of the cross sectional area of the raw pipe pin.

For improved high torque performance (raising the torque value that can be applied without causing deformation, enabling application of a higher make-up torque), it is preferable that the nose forming an unthreaded portion at the tip of the pin (FIG. 5) have a length of 0.2 to 0.5 inches, and a ratio x/L of 0.01 to 0.1, where x represents the seal point position from the pipe end, and L is the nose length. In order to provide a metal-to-metal seal portion having high airtightness, it is preferable that the nose forming an unthreaded portion at the tip of the pin (FIG. 5) have a length of 0.3 to 1.0 inches, and a ratio x/L of 0.2 to 0.5, where x represents the seal point position from the pipe end, and L is the nose length.

A stainless steel seamless pipe according to aspects of the present invention can be produced by using the manufacturing method described above.

As described above, aspects of the present invention provide a cold working method using bending and rebending, and do not perform a low-temperature heat treatment so that a corrosion resistance performance drop due to segregation of molybdenum can be reduced, and an axial compressive yield strength/axial tensile yield strength ratio of 0.85 to 1.15 can be achieved. This makes it possible to provide a dual phase stainless steel seamless pipe having a superior threaded portion satisfying the strength characteristics needed for oil well and gas well applications.

Example 1

Aspects of the present invention are further described below through Examples.

The chemical components represented by A to Z in Table 1 were made into steel with a vacuum melting furnace, and the steel was hot rolled into a round billet having an outer diameter Ø of 80 mm. For Y and Z that had Cr and Mo contents above the ranges of the present invention, the examination was discontinued before cold working because cracks generated in the process of solidifying the molten steel or in hot rolling.

TABLE 1

(mass %)

| Steel grade | C | Si | Mn | Cr | Ni | Mo | W | Cu | N | Ti | Al | V | Nb | B, Zr, Ca, Ta, Sn, Sb, REM | Microstructure | Remarks |
|---|---|---|---|---|---|---|---|---|---|---|---|---|---|---|---|---|
| A | 0.028 | 0.5 | 0.3 | 22.2 | 5.1 | 2.5 | | | 0.081 | | | | | | Ferrite-austenite phase | PE |
| B | 0.028 | 0.5 | 0.3 | 22.1 | 5.0 | 2.8 | | | 0.295 | | | | | | Ferrite-austenite phase | PE |
| C | 0.011 | 0.4 | 0.2 | 22.1 | 4.1 | 3.5 | 0.8 | 1.5 | 0.312 | | | | | | Ferrite-austenite phase | PE |
| D | 0.011 | 0.4 | 1.2 | 22.2 | 4.3 | 3.8 | 1.2 | 1.0 | 0.205 | 0.001 | 0.012 | | | | Ferrite-austenite phase | PE |
| E | 0.071 | 0.1 | 0.2 | 22.3 | 5.1 | 2.7 | | | 0.192 | 0.002 | 0.015 | 0.050 | 0.050 | | Ferrite-austenite phase | PE |
| F | 0.051 | 0.1 | 5.0 | 22.2 | 1.0 | 0.8 | | | 0.201 | | | | | | Ferrite-austenite phase | PE |
| G | 0.041 | 0.2 | 0.2 | 25.1 | 7.9 | 3.6 | | | 0.082 | | | | | | Ferrite-austenite phase | PE |
| H | 0.021 | 0.1 | 0.2 | 25.1 | 7.1 | 3.2 | | | 0.225 | | | | | | Ferrite-austenite phase | PE |
| I | 0.031 | 0.1 | 0.8 | 25.4 | 6.8 | 3.8 | | | 0.335 | | | | | | Ferrite-austenite phase | PE |
| J | 0.012 | 0.1 | 0.2 | 25.3 | 7.3 | 3.8 | 1.5 | 1.3 | 0.221 | | | | | | Ferrite-austenite phase | PE |
| K | 0.025 | 0.6 | 0.8 | 25.8 | 6.6 | 4.2 | 0.4 | 1.6 | 0.245 | 0.002 | 0.033 | 0.110 | 0.130 | | Ferrite-austenite phase | PE |
| L | 0.023 | 0.1 | 0.3 | 25.4 | 5.2 | 3.5 | 0.6 | 1.4 | 0.362 | 0.003 | 0.035 | | | | Ferrite-austenite phase | PE |
| M | 0.025 | 0.1 | 0.8 | 25.4 | 6.8 | 3.4 | | | 0.295 | | | | 0.025 | Ca: 0.0008, B: 0.004 | Ferrite-austenite phase | PE |
| N | 0.035 | 0.3 | 0.5 | 25.3 | 6.9 | 2.6 | 0.2 | 0.8 | 0.285 | | | | 0.030 | Ta: 0.15, Sn: 0.003, Sb: 0.003 | Ferrite-austenite phase | PE |
| O | 0.028 | 0.1 | 0.2 | 25.1 | 7.0 | 3.2 | | | 0.211 | 0.004 | 0.042 | 0.040 | 0.040 | Zr: 0.003, REM: 0.0005 | Ferrite-austenite phase | PE |
| P | 0.025 | 0.1 | 0.3 | 25.3 | 7.0 | 3.1 | 0.2 | 0.8 | 0.235 | 0.003 | 0.062 | | | B: 0.0080 | Ferrite-austenite phase | PE |
| Q | 0.029 | 0.1 | 0.2 | 24.6 | 6.8 | 3.2 | | 2.1 | 0.195 | 0.003 | 0.030 | | | Ca: 0.0080 | Ferrite-austenite phase | PE |
| R | 0.025 | 0.9 | 0.5 | 25.4 | 6.5 | 4.1 | | 0.8 | 0.312 | 0.003 | 0.020 | | | Ta: 0.28 | Ferrite-austenite phase | PE |
| S | 0.008 | 0.1 | 0.3 | 29.6 | 9.8 | 4.5 | | | 0.342 | 0.001 | 0.010 | | | Sn: 0.15, Sb: 0.18 | Ferrite-austenite phase | PE |
| T | 0.014 | 0.4 | 0.1 | 11.1 | 0.6 | 2.1 | | | 0.015 | | | | | | Ferrite-austenite phase | CE |
| U | 0.029 | 0.3 | 0.3 | 25.4 | 0.4 | 2.8 | | | 0.225 | | | | | | Ferrite phase | CE |
| V | 0.079 | 0.5 | 0.3 | 25.3 | 6.4 | 3.3 | 0.0 | 0.0 | 0.285 | | | | | | Ferrite-austenite phase | PE |
| W | 0.030 | 0.3 | 0.3 | 25.4 | 5.9 | 0.4 | | 0.6 | 0.255 | | | | | | Ferrite-austenite phase | CE |
| X | 0.020 | 0.1 | 0.1 | 12.0 | 0.8 | 1.9 | | | 0.010 | | | | | | Ferrite-austenite phase | PE |
| Y | 0.030 | 0.3 | 0.3 | 36.5 | 12.0 | 4.5 | | | 0.330 | | | | | | Ferrite-austenite phase | CE |
| Z | 0.030 | 0.3 | 0.2 | 28.5 | 10.5 | 6.5 | | | 0.320 | | | | | | Ferrite-austenite phase | CE |

Underline means outside of the scope of the present invention. PE: Present Example, CE: Comparative Example After hot rolling, the round billet was put back into the heating furnace, and retained at a high temperature of 1,200° C. or more. The steel was then subjected to pierce rolling and elongation fixed diameter rolling to prepare a base pipe to be cold worked into a product for oil country tubular goods. Here, the base pipe was cold worked into various sizes having the following dimensions: outer diameter Ø=88.9 mm, wall thickness=5.4 to 7.5 mm (t/D=0.062 to 0.083); outer diameter Ø=104.4 mm, wall thickness=15.1 to 22.3 mm (t/D=0.145 to 0.213); outer diameter Ø=139.7 mm, wall thickness=9.0 to 12.1 mm (t/D=0.064 to 0.087); outer diameter Ø=162.1 mm, wall thickness=21.3 to 28.9 mm (t/D=0.132 to 0.178). It is to be noted here that the sizes are not limited to above examples, any size is applicable, as long as it is manufacturable as the seamless steel pipe. As major sizes, from tubing size to a production casing size, the seamless steel pipe may have a pin with a diameter Ø of 60.3 to 244.5 mm, and a coupling raw pipe of a corresponding size. After rolling, the base pipe was subjected to a solid solution heat treatment in a temperature range of 1,000 to 1,150° C.

The solid solution heat treatment was followed by cold working. In cold working, draw rolling and Pilger rolling were performed, in addition to circumferential bending and rebending representing a cold working method according to aspects of the present invention.

Circumferential bending and rebending was performed with two oppositely disposed rolling rolls, or with three rolling rolls circumferentially disposed at a pitch of 120°. Circumferential bending and rebending used a rolling control value, which is a value obtained by multiplying a value of ti/Di by a rolling reduction calculated by (1−Dmin/Di)× 100 [%]. Here, ti/Di is the ratio calculated from initial wall thickness ti and initial outer diameter Di, and the rolling reduction is a value determined from the initial outer diameter Di of the base pipe and the minimum outer diameter Dmin determined by initial wall thickness ti and the roll gap of a rolling mill. (The roll gap of a rolling mill is the narrowest distance between opposing rolls, and, irrespective of the number of rolls, represents the diameter of a true circle drawn in the gap of rolls. The minimum outer diameter Dmin of a pipe becomes the same value as the roll gap.) In order to examine the influence of work frequency, cold working was also performed by repeating the process twice under the same conditions. For some steels, cold working was followed by a low-temperature heat treatment at the temperatures shown in Table 2. The highest reachable temperature of the workpiece was managed by measuring the actual temperatures of steel pipe production in Examples.

In draw rolling and Pilger rolling, a raw pipe having an outer diameter Ø of 139.7 mm and a wall thickness of 12 mm was subjected to elongation rolling that reduces the wall thickness at a percentage reduction of 20%.

The seamless steel pipes produced were measured for axial tensile yield strength and axial compressive yield strength, and circumferential compressive yield strength. Measurements were made in a tensile test and a compression test conducted for a round-rod test specimen and a columnar test specimen, respectively. The specimens, measuring 4 to 6 mm in diameter across a parallel portion, were taken from a middle portion of the wall thickness of the pipe. The tests were conducted at a cross head speed of 1 mm/min for both extension and compression, and the measured values were used to calculate an axial tensile yield strength, an axial compressive yield strength/axial tensile yield strength ratio, and a circumferential compressive yield strength/axial tensile yield strength ratio.

A stress corrosion test was conducted in a chloride sulfide environment. The corrosive environment was created by preparing an aqueous solution (prepared by adding $H_2S$ gas to a 20% NaCl+0.5% $CH_3COOH+CH_3COONa$ aqueous solution under 0.01 to 0.10 MPa pressure, and bringing the pH to 3.0 to 4.5; test temperature=25° C.), simulating an oil well in mining operation. In order to longitudinally apply stress along the pipe axis, a stress equal to 90% of the axial tensile yield strength was applied to a four-point bending test specimen (4 mm (thickness) from a middle portion of the wall thickness), or a round-rod tensile test specimen (having a diameter Ø of 8 mm from the center of wall thickness) cut out from the pipe and immersed in the aqueous solution. For evaluation of corrosion, the test specimen was taken out of the corrosive aqueous solution after 720 hours under applied stress, and the stress-applied surface of the test specimen was immediately observed by visual inspection for the presence or absence of cracks. The test specimen was evaluated as satisfactory (indicated by "○") when it did not have a crack, and unsatisfactory (indicated by "x") when a crack or a fracture was observed.

The seamless steel pipes were also measured for the aspect ratio of austenite grains separated by a misorientation angle of 15°. The aspect ratio was measured by an EBSD crystal orientation analysis carried out for the wall thickness direction of a pipe cross section parallel to the pipe axis. For a 1.2 mm×1.2 mm measurement area, the aspect ratio was measured for austenite grains having a grain size of 10 μm or more as measured for an assumed true circle.

The steel pipes are also measured for Mo concentration (mass %), using a STEM. The Mo concentration was measured for a region having a width of 150 nm (from the edge of a ferrite grain boundary or austenite grain boundary) and a length of 2 nm (a length parallel to the grain boundary) at a pitch of 0.2 nm. The Mo concentration (mass %) was also measured for the ferrite grain boundary or austenite grain boundary at a pitch of 0.2 nm (the measurement region corresponds to the grain boundary, corresponding to the shaded area of grain boundary in FIG. 1; the peak value was used). For grain boundaries (ferrite grain boundary, ferrite-austenite grain boundary, and austenite grain boundary), the maximum value (peak value) of Mo concentrations (mass %) from each measurement region was used. A mean value was used for intragranular Mo concentrations (mass %) from each measurement region (intragranular Mo concentration of ferrite, intragranular Mo concentration of austenite). The maximum value was divided by the mean value (peak value/mean value) to determine the Mo concentration of ferrite grain boundary relative to the intragranular Mo concentration of ferrite (ferrite grain boundary/ferrite grain), the Mo concentration of ferrite-austenite grain boundary relative to the intragranular Mo concentration of ferrite (ferrite-austenite grain boundary/ferrite grain), and the Mo concentration of austenite grain boundary relative to the intragranular Mo concentration of austenite (austenite grain boundary/austenite grain). A mean value of intragranular Mo concentrations of ferrite or austenite grains was calculated by excluding data from a 0 to 50 nm region from the edge of the ferrite grain boundary or austenite grain boundary.

Table 2 shows the conditions used for production. Table 3 shows the results.

TABLE 2

| No. | Steel grade | Work method | Number of runs Passes | Number of rolls Rolls | Rolling control value — | Temperature of low-temperature heat treatment ° C. | Highest reachable temperature/ retention time ° C./min | Remarks |
|---|---|---|---|---|---|---|---|---|
| 1 | B | Draw rolling | 1 | — | | — | 220/2 | CE |
| 2 | B | Pilger rolling | 1 | — | | — | 250/4 | CE |
| 3 | B | Pilger rolling | 1 | — | | 400 | 250/4 | CE |
| 4 | H | Draw rolling | 1 | — | | — | 220/2 | CE |
| 5 | H | Draw rolling | 1 | — | | 300 | 220/2 | CE |
| 6 | H | Draw rolling | 1 | — | | 560 | 220/2 | CE |
| 7 | M | Draw rolling | 1 | — | | — | 220/2 | CE |
| 8 | M | Draw rolling | 1 | — | | 350 | 220/2 | CE |
| 9 | A | Bending and rebending | 1 | 3 | 1.3 | — | 110/13 | PE |
| 10 | B | Bending and rebending | 1 | 2 | 1.1 | — | 110/13 | PE |
| 11 | B | Bending and rebending | 1 | 2 | 2.1 | — | 140/1 | PE |
| 12 | B | Bending and rebending | 1 | 3 | 1.3 | — | 110/13 | PE |
| 13 | B | Bending and rebending | 1 | 3 | 2.5 | — | 250/2 | PE |
| 14 | B | Bending and rebending | 1 | 3 | 0.6 | — | 110/8 | PE |
| 15 | B | Bending and rebending | 2 | 3 | 0.5 | — | 110/9 | PE |
| 16 | C | Bending and rebending | 1 | 3 | 1.1 | — | 110/9 | PE |
| 17 | D | Bending and rebending | 1 | 3 | 1.2 | — | 110/9 | PE |
| 18 | E | Bending and rebending | 1 | 3 | 1.1 | — | 110/10 | PE |
| 19 | F | Bending and rebending | 1 | 3 | 1.5 | — | 160/1 | PE |
| 20 | G | Bending and rebending | 1 | 3 | 1.3 | — | 120/8 | PE |
| 21 | H | Draw rolling | 1 | — | — | 350 | 220/1 | CE |
| 22 | H | Pilger rolling | 2 | — | — | — | 250/4 | CE |
| 23 | H | Pilger rolling | 1 | — | — | 450 | 250/4 | CE |
| 24 | H | Bending and rebending | 1 | 2 | 1.5 | — | 180/2 | PE |
| 25 | H | Bending and rebending | 1 | 3 | 1.8 | — | 160/2 | PE |
| 26 | H | Bending and rebending | 2 | 3 | 0.6 | — | 110/8 | PE |
| 27 | I | Bending and rebending | 2 | 2 | 0.9 | — | 110/8 | PE |
| 28 | J | Bending and rebending | 1 | 3 | 1.5 | — | 160/8 | PE |
| 29 | K | Bending and rebending | 1 | 3 | 1.3 | — | 140/8 | PE |
| 30 | L | Bending and rebending | 1 | 2 | 0.8 | — | 110/8 | PE |
| 31 | M | Bending and rebending | 1 | 3 | 1.3 | — | 140/8 | PE |
| 32 | N | Bending and rebending | 1 | 3 | 1.4 | — | 140/8 | PE |
| 33 | O | Bending and rebending | 1 | 3 | 1.3 | — | 140/8 | PE |
| 34 | P | Bending and rebending | 1 | 3 | 0.5 | — | 110/8 | PE |
| 35 | Q | Bending and rebending | 1 | 3 | 1.8 | — | 180/2 | PE |
| 36 | R | Bending and rebending | 1 | 3 | 1.5 | — | 170/2 | PE |
| 37 | S | Bending and rebending | 1 | 3 | 1.3 | — | 110/8 | PE |

TABLE 2-continued

| No. | Steel grade | Work method | Number of runs Passes | Number of rolls Rolls | Rolling control value | Temperature of low-temperature heat treatment ° C. | Highest reachable temperature/ retention time ° C./min | Remarks |
|---|---|---|---|---|---|---|---|---|
| 38 | T | Bending and rebending | 1 | 3 | 1.3 | — | 110/8 | CE |
| 39 | U | Bending and rebending | 1 | 3 | 1.3 | — | 110/8 | CE |
| 40 | V | Bending and rebending | 1 | 3 | 1.3 | — | 110/8 | PE |
| 41 | W | Bending and rebending | 1 | 3 | 1.3 | — | 110/8 | CE |
| 42 | X | Bending and rebending | 1 | 3 | 1.3 | — | 140/8 | PE |
| 43 | X | Bending and rebending | 1 | 3 | 1.3 | 450 | 140/8 | CE |
| 44 | X | Pilger rolling | 1 | — | — | — | 140/8 | CE |
| 45 | B | Bending and rebending | 1 | 3 | 2.9 | — | 330/1 | PE |
| 46 | H | Bending and rebending | 1 | 3 | 2.9 | — | 310/2 | PE |
| 47 | J | Bending and rebending | 1 | 3 | 2.9 | — | 280/16 | PE |
| 48 | W | Bending and rebending | 1 | 3 | 2.9 | — | 310/2 | CE |
| 49 | Y | — | — | — | — | — | — | CE |
| 50 | Z | — | — | — | — | — | — | CE |
| 51 | A | Pilger rolling | 1 | — | — | — | 90/15 | CE |
| 52 | A | Bending and rebending | 1 | 2 | 1.4 | — | 100/5 | PE |
| 53 | G | Draw rolling | 2 | — | — | — | 100/4 | CE |
| 54 | S | Draw rolling | 2 | — | — | — | 100/5 | CE |

Underline means outside of the scope of the present invention. PE: Present Example, CE: Comparative Example

TABLE 3

| No. | Steel grade | Axial tensile yield strength MPa | Aspect ratio | Axial compressive yield strength/ axial tensile yield strength | Circumferential compressive yield strength MPa | Circumferential compressive yield strength/ axial tensile yield strength | Ferrite grain boundary/ ferrite grain | Austenite grain boundary/ austenite grain | Ferrite-austenite grain boundary/ ferrite grain | Cracking ○/x | Remarks |
|---|---|---|---|---|---|---|---|---|---|---|---|
| 1 | B | 871 | 9.1 | 0.83 | 879 | 1.01 | 1.56 | 1.45 | 1.55 | ○ | CE |
| 2 | B | 885 | 9.5 | 0.84 | 912 | 1.03 | 1.55 | 1.44 | 1.53 | ○ | CE |
| 3 | B | 891 | 9.5 | 0.87 | 910 | 1.02 | 4.09 | 4.06 | 4.07 | x | CE |
| 4 | H | 886 | 9.3 | 0.81 | 896 | 1.01 | 1.66 | 1.55 | 1.62 | ○ | CE |
| 5 | H | 891 | 9.3 | 0.86 | 895 | 1.00 | 4.50 | 4.39 | 4.46 | x | CE |
| 6 | H | 890 | 9.3 | 0.91 | 894 | 1.00 | 5.63 | 5.35 | 5.58 | x | CE |
| 7 | M | 884 | 9.1 | 0.82 | 899 | 1.02 | 1.52 | 1.50 | 1.52 | ○ | CE |
| 8 | M | 889 | 9.1 | 0.86 | 898 | 1.01 | 4.70 | 4.61 | 4.68 | x | CE |
| 9 | A | 871 | 3.8 | 1.03 | 875 | 1.00 | 1.49 | 1.44 | 1.48 | ○ | PE |
| 10 | B | 898 | 3.5 | 1.04 | 892 | 0.99 | 1.11 | 1.08 | 1.11 | ○ | PE |
| 11 | B | 895 | 3.8 | 1.09 | 954 | 1.07 | 1.13 | 1.10 | 1.12 | ○ | PE |
| 12 | B | 912 | 2.4 | 1.00 | 930 | 1.02 | 1.09 | 1.07 | 1.09 | ○ | PE |
| 13 | B | 910 | 2.5 | 0.95 | 945 | 1.04 | 1.18 | 1.15 | 1.17 | ○ | PE |
| 14 | B | 871 | 2.5 | 0.95 | 830 | 0.95 | 1.13 | 1.09 | 1.13 | ○ | PE |
| 15 | B | 895 | 2.5 | 0.96 | 905 | 1.01 | 1.10 | 1.07 | 1.09 | ○ | PE |
| 16 | C | 891 | 3.1 | 0.98 | 895 | 1.00 | 1.18 | 1.15 | 1.17 | ○ | PE |
| 17 | D | 885 | 4.6 | 1.01 | 892 | 1.01 | 1.17 | 1.15 | 1.16 | ○ | PE |
| 18 | E | 892 | 2.5 | 1.01 | 902 | 1.01 | 1.04 | 1.02 | 1.04 | ○ | PE |
| 19 | F | 775 | 1.8 | 0.99 | 788 | 1.02 | 1.03 | 1.00 | 1.03 | ○ | PE |
| 20 | G | 871 | 3.9 | 1.01 | 879 | 1.01 | 1.19 | 1.15 | 1.18 | ○ | PE |
| 21 | H | 887 | 9.1 | 0.86 | 893 | 1.01 | 4.70 | 4.55 | 4.68 | x | CE |
| 22 | H | 925 | 10.6 | 0.81 | 932 | 1.01 | 1.54 | 1.45 | 1.50 | ○ | CE |
| 23 | H | 891 | 9.2 | 0.86 | 900 | 1.01 | 5.08 | 4.95 | 5.07 | x | CE |
| 24 | H | 891 | 3.5 | 1.02 | 901 | 1.01 | 1.19 | 1.11 | 1.17 | ○ | PE |
| 25 | H | 925 | 3.4 | 1.01 | 919 | 0.99 | 1.25 | 1.14 | 1.24 | ○ | PE |
| 26 | H | 920 | 3.5 | 1.03 | 935 | 1.02 | 1.33 | 1.21 | 1.30 | ○ | PE |
| 27 | I | 877 | 3.9 | 1.02 | 885 | 1.01 | 1.19 | 1.09 | 1.17 | ○ | PE |
| 28 | J | 885 | 4.9 | 1.09 | 897 | 1.01 | 1.18 | 1.07 | 1.16 | ○ | PE |
| 29 | K | 887 | 4.6 | 1.05 | 892 | 1.01 | 1.19 | 1.08 | 1.17 | ○ | PE |
| 30 | L | 871 | 4.6 | 0.91 | 871 | 1.00 | 1.14 | 1.04 | 1.11 | ○ | PE |
| 31 | M | 875 | 3.2 | 1.01 | 882 | 1.01 | 1.47 | 1.35 | 1.44 | ○ | PE |
| 32 | N | 879 | 4.8 | 1.08 | 899 | 1.02 | 1.17 | 1.06 | 1.15 | ○ | PE |
| 33 | O | 878 | 3.4 | 1.02 | 888 | 1.01 | 1.18 | 1.07 | 1.17 | ○ | PE |
| 34 | P | 871 | 4.6 | 0.92 | 888 | 1.02 | 1.16 | 1.04 | 1.12 | ○ | PE |
| 35 | Q | 925 | 4.9 | 1.03 | 935 | 1.01 | 1.14 | 1.03 | 1.10 | ○ | PE |
| 36 | R | 892 | 3.9 | 1.02 | 921 | 1.03 | 1.19 | 1.08 | 1.15 | ○ | PE |
| 37 | S | 935 | 4.9 | 1.04 | 955 | 1.02 | 1.45 | 1.33 | 1.42 | ○ | PE |
| 38 | T | 711 | 3.5 | 1.01 | 811 | 1.14 | 1.14 | 1.07 | 1.11 | x | CE |
| 39 | U | 589 | — | 0.92 | 610 | 1.04 | 1.25 | 1.16 | 1.21 | x | CE |
| 40 | V | 895 | 3.5 | 1.02 | 925 | 1.03 | 1.17 | 1.08 | 1.16 | ○ | PE |
| 41 | W | 869 | 2.5 | 1.01 | 880 | 1.01 | 1.02 | 1.01 | 1.02 | x | CE |
| 42 | X | 690 | 3.2 | 1.02 | 712 | 1.03 | 1.45 | 1.33 | 1.42 | ○ | PE |

TABLE 3-continued

| No. | Steel grade | Axial tensile yield strength MPa | Aspect ratio | Axial compressive yield strength/ axial tensile yield strength | Circumferential compressive yield strength MPa | Circumferential compressive yield strength/ axial tensile yield strength | Ferrite grain boundary/ ferrite grain | Austenite grain boundary/ austenite grain | Ferrite-austenite grain boundary/ ferrite grain | Cracking ○/x | Remarks |
|---|---|---|---|---|---|---|---|---|---|---|---|
| 43 | X | 695 | 3.2 | 1.01 | 721 | 1.04 | 4.30 | 4.11 | 4.28 | x | CE |
| 44 | X | 722 | 10.9 | 0.81 | 733 | 1.02 | 1.56 | 1.35 | 1.54 | ○ | CE |
| 45 | B | 998 | 2.3 | 1.02 | 1011 | 1.01 | 1.86 | 1.68 | 1.80 | ○ | PE |
| 46 | H | 988 | 2.9 | 1.03 | 992 | 1.00 | 1.88 | 1.55 | 1.80 | ○ | PE |
| 47 | J | 989 | 4.8 | 1.09 | 999 | 1.01 | 1.89 | 1.56 | 1.85 | ○ | PE |
| 48 | W | 922 | 2.1 | 1.02 | 935 | 1.01 | 1.11 | 1.04 | 1.09 | x | CE |
| 49 | Y | — | — | — | — | — | — | — | — | — | CE |
| 50 | Z | — | — | — | — | — | — | — | — | — | CE |
| 51 | A | 869 | 9.2 | 0.84 | 897 | 1.03 | 1.53 | 1.53 | 1.51 | ○ | CE |
| 52 | A | 862 | 3.9 | 1.06 | 889 | 1.03 | 1.55 | 1.51 | 1.52 | ○ | PE |
| 53 | G | 885 | 10.8 | 0.81 | 911 | 1.03 | 1.21 | 1.16 | 1.18 | ○ | CE |
| 54 | S | 933 | 12.5 | 0.82 | 959 | 1.03 | 1.55 | 1.35 | 1.45 | ○ | CE |

Underline means outside of the scope of the present invention.
*In No. 39, aspect ratio "—" means that measurement was not possible because of the absence of austenite phase PE: Present Example, CE: Comparative Example As can be seen from the results presented in Table 3, the amount of molybdenum segregation had a factor of 4.0 or less in all of the present examples, and the steel pipes of the present examples had excellent corrosion resistance. The steel pipes of the present examples also had superior axial tensile yield strength, and the axial tensile yield strength and the axial compressive yield strength had small differences. In contrast, products produced by using a conventional cold rolling method or Comparative Examples in which such steel pipes were subjected to a low-temperature heat treatment failed to meet the required criteria with regard to any of axial tensile yield strength, compressive yield strength/axial tensile yield strength, and corrosion resistance.

Example 2

The threaded joint was evaluated, as follows. An end portion of the dual phase stainless steel pipe obtained in Example 1 was machined to form a trapezoidal threaded portion (see FIG. 3(a)), and the threaded portion was subjected to a fatigue test. In the fatigue test, a joint was made by connecting two steel pipes, and the pipe ends of the two steel pipes were rotated with 3 to 10% eccentricity, depending on the axial tensile yield strength of the steel pipe. The threaded portion was tested with different values of corner R, a portion where the stress concentrates, as shown in Table 4. The number of rotations that causes a fatigue crack at the stress concentrating portion, or that causes the thread ridge to break as a result of propagation of fatigue cracking was investigated. The results for the steel pipes of the present examples were then compared with the results for steel pipes obtained using the conventional method (Comparative Examples of Example 1). The results of comparisons were represented as ratios relative to the conventional method. Steel pipes with ratios greater than 1 were determined as having superior characteristics with an extended fatigue life.

Steels A, B, G, H, and S of the present examples were used to prepare a threaded joint constructed from a pin (steel pipe size: outer diameter Ø=88.9 mm, wall thickness t=5.5, 6.5 mm) and a corresponding coupling, a threaded joint constructed from a pin (steel pipe size: outer diameter Ø=244.5 mm, wall thickness t=13.8 mm) and a corresponding coupling, and a threaded joint constructed from a pin (steel pipe size: outer diameter Ø=139.7 mm, wall thickness t=14.3 mm) and a corresponding coupling, as shown in Table 4. The threaded joint was prepared as a joint having only a threaded portion, and as a premium joint having a threaded portion, a seal portion, and a shoulder portion. These joints were then subjected to the fatigue test described above. Table 4 shows curvature radiuses R of load flank and stabbing flank corners at the root of the pin thread, and curvature radiuses R of load flank and stabbing flank corners at the root of the coupling thread.

TABLE 4

| Steel No. Pipe | Steel grade | Steel pipe size (pin) | Thread type | Thread fatigue test No. | Curvature radius of corner (mm) | | | | Results of fatigue test | |
|---|---|---|---|---|---|---|---|---|---|---|
| | | | | | Load flank of pin | Stabbing flank of pin | Load flank of coupling | Stabbing flank of coupling | No. compared | Fatigue characteristic |
| 51 | A | ϕ 88.9 mm, t 6.5 mm | Premium joint | A-1 | 0.2 | 0.2 | 0.2 | 0.2 | — | — |
| | | | | A-2 | 0.4 | 0.4 | 0.4 | 0.4 | — | — |
| | | | | A-3 | 0.6 | 0.6 | 0.6 | 0.6 | — | — |
| | | | | A-4 | 0.1 | 0.1 | 0.1 | 0.1 | A-1 | 0.75 |
| 52 | | | | A-5 | 0.2 | 0.2 | 0.2 | 0.2 | A-1 | 1.31 |
| | | | | A-6 | 0.4 | 0.4 | 0.4 | 0.4 | A-2 | 1.22 |
| | | | | A-7 | 0.6 | 0.6 | 0.6 | 0.6 | A-3 | 1.18 |
| 9 | | | | A-8 | 0.2 | 0.2 | 0.2 | 0.2 | A-1 | 1.45 |
| | | | | A-9 | 0.4 | 0.4 | 0.4 | 0.4 | A-2 | 1.33 |
| | | | | A-10 | 0.6 | 0.6 | 0.6 | 0.6 | A-3 | 1.29 |
| 1 | B | ϕ 244.5 mm, t 13.8 mm | Premium joint | B-1 | 0.2 | 0.2 | 0.2 | 0.2 | — | — |
| | | | | B-2 | 0.4 | 0.4 | 0.4 | 0.4 | — | — |
| | | | | B-3 | 0.6 | 0.6 | 0.6 | 0.6 | — | — |
| | | | | B-4 | 0.1 | 0.1 | 0.1 | 0.1 | B-1 | 0.65 |

TABLE 4-continued

| Steel No. Pipe | Steel grade | Steel pipe size (pin) | Thread type | Thread fatigue test No. | Curvature radius of corner (mm) | | | | Results of fatigue test | |
|---|---|---|---|---|---|---|---|---|---|---|
| | | | | | Load flank of pin | Stabbing flank of pin | Load flank of coupling | Stabbing flank of coupling | No. compared | Fatigue characteristic |
| 11 | | | | B-5 | 0.2 | 0.2 | 0.2 | 0.2 | B-1 | 1.33 |
| | | | | B-6 | 0.4 | 0.4 | 0.4 | 0.4 | B-2 | 1.29 |
| | | | | B-7 | 0.6 | 0.6 | 0.6 | 0.6 | B-3 | 1.27 |
| 14 | | | | B-8 | 0.2 | 0.2 | 0.2 | 0.2 | B-1 | 1.55 |
| | | | | B-9 | 0.4 | 0.4 | 0.4 | 0.4 | B-2 | 1.51 |
| | | | | B-10 | 0.6 | 0.6 | 0.6 | 0.6 | B-3 | 1.44 |
| 53 | G | φ 88.9 mm, t 5.5 mm | Threaded portion only | G-1 | 0.2 | 0.2 | 0.2 | 0.2 | — | — |
| | | | | G-2 | 0.3 | 0.3 | 0.3 | 0.3 | — | — |
| | | | | G-3 | 0.6 | 0.6 | 0.6 | 0.6 | — | — |
| | | | | G-4 | 0.1 | 0.1 | 0.1 | 0.1 | G-1 | 0.60 |
| 20 | | | | G-5 | 0.2 | 0.2 | 0.2 | 0.2 | G-1 | 1.67 |
| | | | | G-6 | 0.3 | 0.3 | 0.3 | 0.3 | G-2 | 1.59 |
| | | | | G-7 | 0.6 | 0.6 | 0.6 | 0.6 | G-3 | 1.55 |
| 21 | H | φ 88.9 mm, t 6.5 mm | Premium joint | H-1 | 0.2 | 0.2 | 0.2 | 0.2 | — | — |
| | | | | H-2 | 0.4 | 0.4 | 0.4 | 0.4 | — | — |
| | | | | H-3 | 1.2 | 1.2 | 1.2 | 1.2 | — | — |
| 24 | | | | H-4 | 0.2 | 0.2 | 0.2 | 0.2 | H-1 | 1.88 |
| | | | | H-5 | 0.4 | 0.4 | 0.4 | 0.4 | H-2 | 1.79 |
| | | | | H-6 | 1.2 | 1.2 | 1.2 | 1.2 | H-3 | 1.79 |
| 25 | | | | H-7 | 0.2 | 0.2 | 0.2 | 0.2 | H-1 | 1.91 |
| | | | | H-8 | 0.4 | 0.4 | 0.4 | 0.4 | H-2 | 1.89 |
| | | | | H-9 | 1.2 | 1.2 | 1.2 | 1.2 | H-3 | 1.88 |
| 54 | S | φ 139.7 mm, t 14.3 mm | Premium joint | S-1 | 0.2 | 0.2 | 0.2 | 0.2 | — | — |
| | | | | S-2 | 0.7 | 0.7 | 0.7 | 0.7 | — | — |
| | | | | S-3 | 2.5 | 2.5 | 2.5 | 2.5 | — | — |
| | | | | S-4 | 0.1 | 0.1 | 0.1 | 0.1 | S-1 | 0.70 |
| 37 | | | | S-5 | 0.2 | 0.2 | 0.2 | 0.2 | S-1 | 1.22 |
| | | | | S-6 | 0.7 | 0.7 | 0.7 | 0.7 | S-2 | 1.21 |
| | | | | S-7 | 2.5 | 2.5 | 2.5 | 2.5 | S-3 | 1.15 |

As can be seen from the results shown in Table 4, the stainless steel seamless pipes according to aspects of the present invention all have superior fatigue characteristics.

The premium joints were evaluated for design of torque shoulder portions. As shown in Table 5, a make-up test (yield torque evaluation test) was conducted for threaded joints (premium joints) constructed from a pin (outer diameter Ø=88.9 mm, wall thickness t=6.5 mm, tensile strength=689 MPa) and a corresponding coupling.

TABLE 5

| Steel pipe No. | Steel grade | Thread fatigue test No. | Steel pipe size (pin) | Nose length L (inch) | x/L | Cross sectional area ratio of portion | Results of thread test Yield torque [N·m] |
|---|---|---|---|---|---|---|---|
| 51 | A | A-1 | φ 88.9 mm, t 6.5 mm | 0.25 | 0.03 | 0.2 | 3000 |
| | | A-2 | | | | 0.2 | 3000 |
| | | A-3 | | | | 0.2 | 3000 |
| 9 | | A-7 | | | | 0.2 | 4000 |
| | | A-8 | | | | 0.2 | 4000 |
| | | A-9 | | | | 0.2 | 4000 |
| 21 | H | H-1 | φ 88.9 mm, t 6.5 mm | 0.45 | 0.09 | 0.25 | 4000 |
| | | H-2 | | | | 0.25 | 4000 |
| | | H-3 | | | | 0.25 | 4000 |
| 24 | | H-4 | | | | 0.25 | 4500 |
| | | H-5 | | | | 0.25 | 4500 |
| | | H-6 | | | | 0.25 | 4500 |
| 25 | | H-7 | | | | 0.5 | 8000 |
| | | H-8 | | | | 0.5 | 8000 |
| | | H-9 | | | | 0.5 | 8000 |

Specifically, it was found that yielding occurs at a make-up torque of 3,000 N·m when the cross sectional area of the shoulder portion was less than 20% of the cross sectional area of the unworked portion of the pin. That is, a sufficiently high torque of 4,000 N·m or more can be applied to tighten the threads without yielding when the cross sectional area of the shoulder portion is at least 20% of the cross sectional area of the unworked portion of the pin. The required percentage is at least 25% for conventional dual phase stainless steels having low strength against compression. The test confirmed that the dual phase stainless steels according to aspects of the present invention, even with the shoulder portion having a cross sectional area at least 20% of the cross sectional area of the unworked portion of the pin, can advantageously receive a torque comparable to that achievable with conventional stainless steels. The results are presented in Table 5.

Another type of high-performance threaded joint that is currently in need is a threaded joint having sealability high enough to pass the seal test of ISO 13679:2019. To investigate the possibility for such a threaded joint, a seal test was conducted for threaded joints (premium joints) constructed from a pin (outer diameter Ø=88.9 mm, wall thickness t=6.5 mm, tensile strength=689 MPa) and a corresponding coupling, and threaded joints (premium joints) constructed from a pin (outer diameter Ø=244.5 mm, wall thickness t=13.8 mm) and a corresponding coupling, as shown in Table 6.

TABLE 6

| Steel pipe No. | Steel grade | Thread fatigue test No. | Steel pipe size (pin) | Nose length L (inch) | x/L | Seal test Sealability compression rate (%) |
|---|---|---|---|---|---|---|
| 51 | A | A-1 | φ 88.9 mm, t 6.5 mm | 0.35 | 0.25 | 79 |
| | | A-2 | | | | 79 |
| | | A-3 | | | | 79 |
| 9 | | A-7 | | | | 100 |
| | | A-8 | | | | 100 |
| | | A-9 | | | | 100 |
| 21 | H | H-1 | φ | 0.90 | 0.45 | 85 |

TABLE 6-continued

| Steel pipe No. | Steel grade | Thread fatigue test No. | Steel pipe size (pin) | Nose length L (inch) | x/L | Seal test Sealability compression rate (%) |
|---|---|---|---|---|---|---|
| | | H-2 | 244.5 mm, t 13.8 mm | | | 85 |
| | | H-3 | | | | 85 |
| 24 | | H-4 | | | | 100 |
| | | H-5 | | | | 100 |
| | | H-6 | | | | 100 |
| 25 | | H-7 | | | | 100 |
| | | H-8 | | | | 100 |
| | | H-9 | | | | 100 |

It was found from the results presented in Tables 5 and 6 that a threaded joint that can be made even with a shoulder having a smaller cross sectional area can be provided by using the stainless steel seamless pipes according to aspects of the present invention. This characteristic provides more freedom in the design of threaded joints, and enables formation of two types of high-performance threaded joints, as follows.

As an example, a first type of high-performance threaded joint is a high-torque threaded joint capable of retaining sealability even under a high make-up torque. High torque performance can be obtained by using a stainless steel seamless pipe having high strength against compression, such as a stainless steel seamless pipe according to aspects of the present invention. Even higher torque performance can be provided by appropriately designing the threaded joint. Specifically, a threaded joint is designed that has a length of 0.2 to 0.5 inches for the nose forming an unthreaded portion at the tip of the pin, and a ratio x/L of 0.01 to 0.1, where x represents the seal point position from the pipe end, and L is the nose length.

The seal test also revealed that a metal-to-metal seal portion having high airtightness can be provided when the length of the nose forming an unthreaded portion at the tip of the pin is preferably 0.3 to 1.0 inches, and the ratio x/L of the seal point position x from the pipe end with respect to the nose length L is preferably 0.2 to 0.5. With conventional materials, increasing the nose length and having a seal point further away from the pipe end necessitates a shoulder portion having a reduced cross sectional area. Such design is very likely to cause yielding, if possible at all. This problem becomes more pronounced in thin steel pipes, and design of satisfactory steel pipes is not possible with a wall thickness of 6.5 mm. Stainless steel seamless pipes according to aspects of the present invention have high strength against compression, and can avoid the yielding problem when the cross sectional area of the shoulder portion is 20%. This enabled design that satisfies high sealability while providing a sufficient cross sectional area for the shoulder portion. As shown in Table 6, it was confirmed that steel pipes having an axial compressive yield strength/axial tensile yield strength ratio of 0.85 or more can pass the seal test at 85% compression rate under the test load of ISO 13679: 2019. It was also confirmed that the steel pipes can pass the seal test at 100% compression rate when the axial compressive yield strength/axial tensile yield strength ratio is 1.0 or more.

The invention claimed is:

1. A stainless steel seamless pipe of a stainless steel having a composition comprising, in mass %, Cr: 11.5 to 35.0%, and Mo: 0.5 to 6.0%, and including ferrite and austenite, the stainless steel seamless pipe having a ferrite grain boundary and/or a ferrite-austenite grain boundary with a Mo concentration (mass %) that is at most 4.0 times the intragranular Mo concentration (mass %) of ferrite, or an austenite grain boundary with a Mo concentration (mass %) that is at most 4.0 times the intragranular Mo concentration (mass %) of austenite, the stainless steel seamless pipe having an axial tensile yield strength of 689 MPa or more, and an axial compressive yield strength/axial tensile yield strength ratio of 0.85 to 1.15.

2. The stainless steel seamless pipe according to claim 1, wherein the stainless steel seamless pipe has a circumferential compressive yield strength/axial tensile yield strength ratio of 0.85 or more.

3. The stainless steel seamless pipe according to claim 1, wherein the composition further comprises at least one selected from following groups A to D consisting of:
   Group A: in mass %, C: 0.08% or less, Si: 1.0% or less, Mn: 10.0% or less, Ni: 15.0% or less, and N: less than 0.400%, and the balance is Fe and incidental impurities;
   Group B: in mass %, one or two or more selected from W: 6.0% or less, Cu: 4.0% or less, V: 1.0% or less, and Nb: 1.0% or less
   Group C: in mass %, one or two selected from Ti: 0.30% or less, and Al: 0.30% or less; and
   Group D: in mass %, one or two or more selected from B: 0.010% or less, Zr: 0.010% or less, Ca: 0.010% or less, Ta: 0.30% or less, Sb: 0.30% or less, Sn: 0.30% or less, and REM: 0.010% or less.

4. The stainless steel seamless pipe according to claim 1, wherein the stainless steel seamless pipe comprises pipe end portions at least one of which has a make-up portion for an external thread or an internal thread, and the make-up portion has a curvature radius of 0.2 mm or more for a corner formed by a flank surface of the make-up portion and a bottom surface of a thread root of the make-up portion.

5. The stainless steel seamless pipe according to claim 1, wherein the axial compressive yield strength/axial tensile yield strength ratio is from 0.92 to 1.15.

6. The stainless steel seamless pipe according to claim 1, wherein the axial compressive yield strength/axial tensile yield strength ratio is from 0.95 to 1.15.

7. The stainless steel seamless pipe according to claim 2, wherein the composition further comprises at least one selected from following groups A to D consisting of:
   Group A: in mass %, C: 0.08% or less, Si: 1.0% or less, Mn: 10.0% or less, Ni: 15.0% or less, and N: less than 0.400%, and the balance is Fe and incidental impurities;
   Group B: in mass %, one or two or more selected from W: 6.0% or less, Cu: 4.0% or less, V: 1.0% or less, and Nb: 1.0% or less
   Group C: in mass %, one or two selected from Ti: 0.30% or less, and Al: 0.30% or less; and
   Group D: in mass %, one or two or more selected from B: 0.010% or less, Zr: 0.010% or less, Ca: 0.010% or less, Ta: 0.30% or less, Sb: 0.30% or less, Sn: 0.30% or less, and REM: 0.010% or less.

8. The stainless steel seamless pipe according to claim 2, wherein the stainless steel seamless pipe comprises pipe end portions at least one of which has a make-up portion for an external thread or an internal thread, and the make-up portion has a curvature radius of 0.2 mm or more for a corner formed by a flank surface of the make-up portion and a bottom surface of a thread root of the make-up portion.

9. The stainless steel seamless pipe according to claim 3, wherein the stainless steel seamless pipe comprises pipe end portions at least one of which has a make-up portion for an external thread or an internal thread, and the make-up portion has a curvature radius of 0.2 mm or more for a corner formed by a flank surface of the make-up portion and a bottom surface of a thread root of the make-up portion.

10. The stainless steel seamless pipe according to claim 7, wherein the stainless steel seamless pipe comprises pipe end portions at least one of which has a make-up portion for an external thread or an internal thread, and the make-up portion has a curvature radius of 0.2 mm or more for a corner formed by a flank surface of the make-up portion and a bottom surface of a thread root of the make-up portion.

11. The stainless steel seamless pipe according to claim 4, wherein the make-up portion has a metal-to-metal seal portion and a torque shoulder portion.

12. The stainless steel seamless pipe according to claim 8, wherein the make-up portion has a metal-to-metal seal portion and a torque shoulder portion.

13. The stainless steel seamless pipe according to claim 9, wherein the make-up portion has a metal-to-metal seal portion and a torque shoulder portion.

14. The stainless steel seamless pipe according to claim 10, wherein the make-up portion has a metal-to-metal seal portion and a torque shoulder portion.

15. A method for manufacturing a stainless steel seamless pipe of claim 1,
the method comprising cold circumferential bending and rebending after a solid solution heat treatment.

16. A method for manufacturing a stainless steel seamless pipe of claim 2,
the method comprising cold circumferential bending and rebending after a solid solution heat treatment.

17. A method for manufacturing a stainless steel seamless pipe of claim 3,
the method comprising cold circumferential bending and rebending after a solid solution heat treatment.

18. A method for manufacturing a stainless steel seamless pipe of claim 7,
the method comprising cold circumferential bending and rebending after a solid solution heat treatment.

19. The method for manufacturing a stainless steel seamless pipe according to claim 15, wherein a workpiece in the cold circumferential bending and rebending has a highest reachable temperature of 300° C. or less, and a retention time of 15 minutes or less at the highest reachable temperature.

20. The method for manufacturing a stainless steel seamless pipe of claim 16, wherein a workpiece in the cold circumferential bending and rebending has a highest reachable temperature of 300° C. or less, and a retention time of 15 minutes or less at the highest reachable temperature.

21. The method for manufacturing a stainless steel seamless pipe of claim 17, wherein a workpiece in the cold circumferential bending and rebending has a highest reachable temperature of 300° C. or less, and a retention time of 15 minutes or less at the highest reachable temperature.

22. The method for manufacturing a stainless steel seamless pipe of claim 18, wherein a workpiece in the cold circumferential bending and rebending has a highest reachable temperature of 300° C. or less, and a retention time of 15 minutes or less at the highest reachable temperature.

* * * * *